United States Patent
Mohri et al.

(10) Patent No.: US 6,456,971 B1
(45) Date of Patent: *Sep. 24, 2002

(54) SYSTEMS AND METHODS FOR DETERMINIZING AND MINIMIZING A FINITE STATE TRANSDUCER FOR PATTERN RECOGNITION

(75) Inventors: Mehryar Mohri, New York, NY (US); Fernando Carlos Neves Pereira, Westfield, NJ (US); Michael Dennis Riley, New York, NY (US)

(73) Assignee: AT&T Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/697,139

(22) Filed: Oct. 27, 2000

Related U.S. Application Data

(62) Division of application No. 09/165,423, filed on Oct. 2, 1998, now Pat. No. 6,243,679, which is a continuation of application No. 08/781,368, filed on Jan. 21, 1997, now abandoned.

(51) Int. Cl.[7] .............................................. G10L 15/14
(52) U.S. Cl. .......................... 704/256; 704/10; 704/255; 704/257
(58) Field of Search ................................. 704/256, 257, 704/255, 231, 251, 242, 9, 10

(56) References Cited

U.S. PATENT DOCUMENTS 5,495,409 A * 2/1996 Kamno ........................ 364/184
5,737,621 A * 4/1998 Kaplan et al. .............. 395/793

OTHER PUBLICATIONS

Deller, Proakis and Harisen "Discrete–Time Processing of Speech Signals" Prentice–Hall, pp. 754, 755 and 774.
Wayne Wolf, "An Alogorithm for Nearly–Minimal Collapsing of Finite–State Machine Networks", IEEE Comput. Soc. Press, Nov. 15, 1990, pp. 80–83.

* cited by examiner

*Primary Examiner*—Richemond Dorvil
(74) *Attorney, Agent, or Firm*—Oliff & Berridge, PLC

(57) ABSTRACT

A pattern recognition system and method for optimal reduction of redundancy and size of a weighted and labeled graph presents receiving speech signals, converting the speech signals into word sequence, interpreting the word sequences in a graph where the graph is labeled with word sequences and weighted with probabilities and determinizing the graph by removing redundant word sequences. The size of the graph can also be minimized by collapsing some nodes of the graph in a reverse determinizing manner. The graph can further be tested for determinizability to determine if the graph can be determinized. The resulting word sequence in the graph may be shown in a display device so that recognition of speech signals can be demonstrated.

24 Claims, 9 Drawing Sheets

FIG. 3

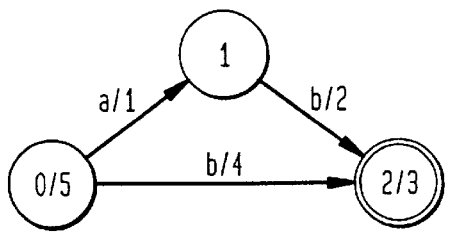

FIG. 4

```
PowerSeriesDetermination (τ₁,τ₂)
```
1. $F_2 \leftarrow 0$
2. $\lambda_2 \leftarrow \bigoplus_{i \in I_1} \lambda_1(i)$
3. $i_2 \leftarrow \bigcup_{i \in I_1} \{(i, \lambda_2^{-1} \odot \lambda_1(i))\}$
4. $Q \leftarrow \{i_2\}$
5. WHILE $Q \neq 0$
6. DO $q_2 \leftarrow \text{HEAD}(Q)$
7.    IF (THERE EXISTS $(q,x) \in q_2$ SUCH THAT $q \in F_1$)
8.    THEN $F_2 \leftarrow F_2 \cup \{q_2\}$
9.       $\rho_2(q_2) \leftarrow \bigoplus_{q \in F_1, (q,x) \in q_2} x \odot \rho_1(q)$
10.    FOR EACH $a$ SUCH THAT THERE EXISTS $(q,x) \in q_2$ WITH $\delta_1(q,a)$ DEFINED
11.    DO $\sigma_2(q_2,a) \leftarrow \bigoplus_{(q,x) \in \Gamma(q_2,a)} [x \odot \bigoplus_{(q' \in \delta_1(q,x)} \sigma_1(q,a,q')]$
12.       $\delta_2(q_2,a) \leftarrow \bigcup_{q' \in \gamma(q_2,a)} \{(q', \bigoplus_{((q,x),q') \in q_2 \times \delta_1(q,a)} [\sigma_2(q_2,a)]^{-1} \odot x \odot \sigma_1(q,a,q'))\}$
13.     IF ($\delta_2(q_2,a)$ IS A NEW STATE)
14.     THEN ENQUEUE $(Q, \delta_2(q_2,a))$
15.    DEQUEUE($Q$)

FIG. 11
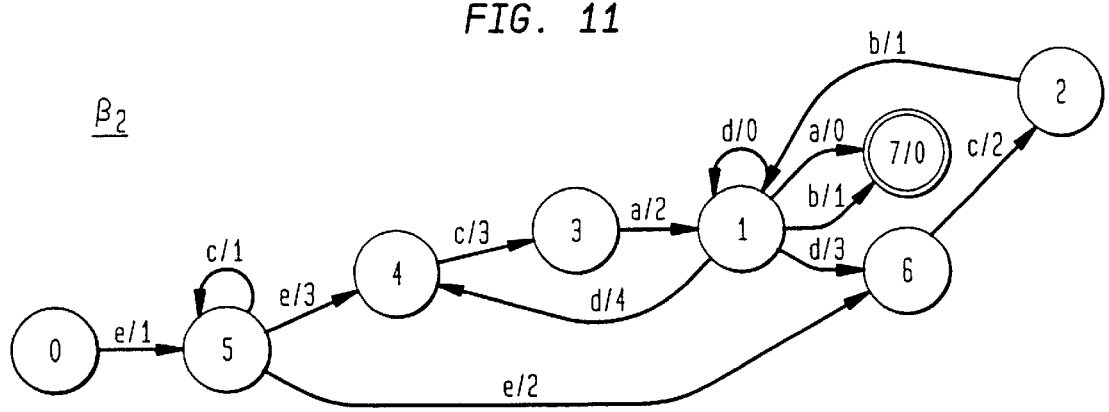
FIG. 12
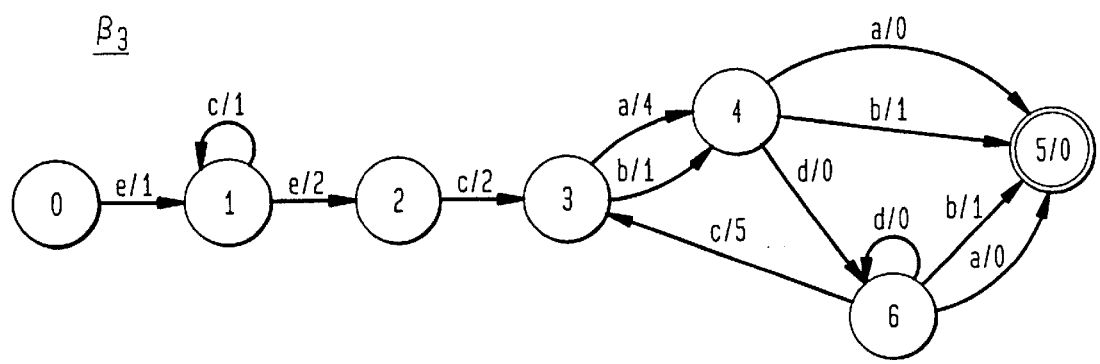
FIG. 13

$\underline{W_1}$

FIG. 15
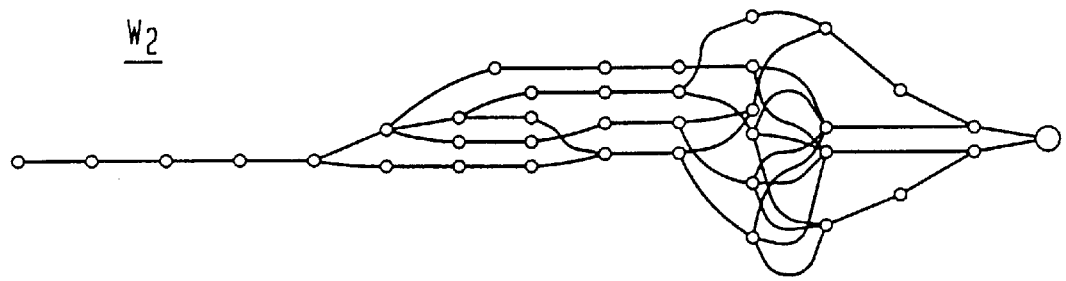
FIG. 16
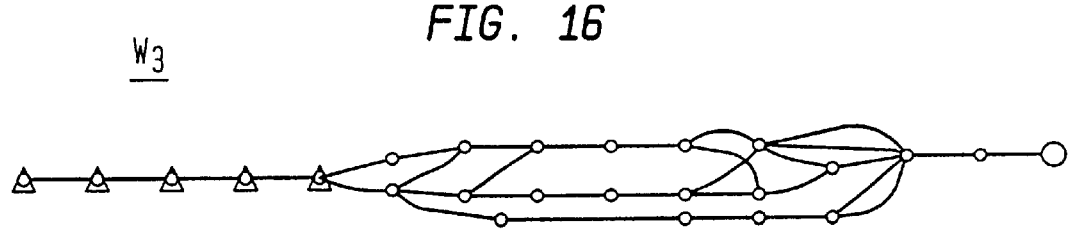
FIG. 17
| OBJECTS | DETERMINIZATION REDUCTION FACTOR | DETERMINIZATION + MINIMIZATION REDUCTION FACTOR |
|---|---|---|
| STATES | $\approx 3$ | $\approx 5$ |
| TRANSITIONS | $\approx 9$ | $\approx 17$ |
| PATNS | $> 2^{32}$ | $> 2^{32}$ |
FIG. 18
| MINIMIZATION RESULTS | |
|---|---|
| OBJECTS | REDUCTION FACTOR |
| STATES | $\approx 4$ |
| TRANSITIONS | $\approx 3$ |

SYSTEMS AND METHODS FOR DETERMINIZING AND MINIMIZING A FINITE STATE TRANSDUCER FOR PATTERN RECOGNITION

This is a divisional of application Ser. No. 09/165,423, filed Oct. 2, 1998, now issued as U.S. Pat. No. 6,243,679, which is a continuation of application Ser. No. 08/781,368, filed Jan. 21, 1997, now abandoned.

BACKGROUND OF THE INVENTION

This invention relates to pattern recognition systems. More particularly, the invention relates to determinization and minimization in natural language processing.

Finite-state machines have been used in many areas of computational linguistics. Their use can be justified by both linguistic and computational arguments. Linguistically, finite automata, which are directed graphs having states and transitions, are convenient since they allow one to describe easily most of the relevant local phenomena encountered in the empirical study of language. They often provide a compact representation of lexical rules or idioms and cliches which appears as natural to linguists. Graphic tools also allow one to visualize and modify automata. This helps in correcting and completing a grammar. Other more general phenomena such as parsing context-free grammars can also be dealt with using finite-state machines. Moreover, the underlying mechanisms in most of the methods used in parsing are related to automata.

From the computational point of view, the use of finite-state machines is mainly motivated by considerations of time and space efficiency. Time efficiency is usually achieved by using deterministic algorithms that reduce redundancy in the automata. The output of deterministic machines depends, in general linearly, only on the input size and can therefore be considered as optimal from this point of view. Space efficiency is achieved with classical minimization algorithms that collapse some nodes in the determinized automata in a reverse determinizing manner. Applications such as compiler construction have shown deterministic finite-state automata to be very efficient in practice. Finite-state automata also constitute now a rich chapter of theoretical computer science.

Their recent applications in natural language processing which range from the construction of lexical analyzers and the compilation of morphological and phonological rules to speech processing show the practical efficiency of finite-state machines in many areas.

Both time and space concerns are important when dealing with language. Indeed, one of the trends which clearly come out of new studies of language is a large increase in the size of data. Lexical approaches have shown to be the most appropriate in many areas of computational linguistics ranging from large-scale dictionaries in morphology to large lexical grammars in syntax. The effect of the size increase on time and space efficiency is probably the main computational problem one needs to face in language processing.

The use of finite-state machines in natural language processing is certainly not new. Indeed, sequential finite-state transducers are now used in all areas of computational linguistics. Limitations of the corresponding techniques, however, are very often pointed out more than their advantages. This might be explained by the lack of description of recent works in computer science manuals.

It is therefore an object of this invention to provide a pattern recognition system that applies determinization means to achieve time efficiency and minimization means to achieve space efficiency.

It is a more particular object of this invention to provide the speech recognition system that allows pruning of the automata by determinization without loss of information and better control of the result while taking account the word content represented by weights applied to automata.

It is another object of this invention to provide the speech recognition system that also allows pruning of the automata by minimization without loss of information while using equivalent functions as determinization.

It is yet another object of this invention to provide the speech recognition system that further allows testing of given automata to determine whether it can be determinized by a determinizability test.

SUMMARY OF THE INVENTION

These and other objects of the invention are accomplished in accordance with the principles of the present invention by providing a system and method for optimal reduction of redundancy and size of a weighted and labeled graph. The system and method of the present invention presents labeling the graph by assigning contents to arcs in the graph, evaluating weights of each path between states by examining relationship between the labels, assigning the weight to each arc and determinizing the graph by removing redundant arcs with the same weights. The system and method may further provide the step of minimizing the graph by collapsing a portion of the states in the graph in a reverse determinizing manner.

In another aspect of the invention, the system and method of the present invention may be applied for use in a language processing. Such system and method presents receiving speech signals, converting the speech signals into word sequences, evaluating the probability that each word sequence would be spoken, interpreting the word sequences in terms of the graph having its arcs labeled with the word sequences and its path weighted with the evaluated probabilities and determinizing the graph by removing redundant word sequences in the graph during the interpretation. The system and method may further present minimizing the graph by collapsing a portion of the states in a reverse determinizing manner during the interpretation.

Further features of the present invention, its nature and various advantages will be more apparent from the accompanying drawings and the following detailed description of the preferred embodiments.

BRIEF DESCRIPTION OF THE DRAWINGS

FIG. 3 is a graph of illustrative subsequential string to weight transducer.

FIG. 4 is an algorithm for determinization of a transducer $\gamma_1$ representing a power series on the semiring.

FIG. 11 is a graph of illustrative transducer $\beta_2$ obtained by reversing $\beta_1$.

FIG. 12 is a graph of illustrative transducer $\beta_3$ obtained by determinization of $\beta_2$.

FIG. 13 is a graph of illustrative transducer $\beta_4$ obtained by minimization of $\beta_3$.

FIG. 15 is a graph of equivalent word lattice $W_2$ obtained by determinization of $W_1$.

FIG. 16 is a graph of equivalent word lattice $W_3$ obtained by minimization from $W_2$.

FIG. 17 is a table of illustrative word lattices in the ATIS task.

FIG. 18 is a table of illustrative deterministic word lattices in the NAB task.

DETAILED DESCRIPTION OF PREFERRED EMBODIMENTS

The following detailed description presents the description of a system and method for recognizing speech signals, theoretical basis, and algorithmatic tools employed to analyze the complexity of language. It will, however, be apparent to those skilled in the art that the methodology of the invention is broadly applicable to a variety of other pattern recognition systems for optimal reduction of redundancy and size of a weighted and label graph.

1. Overview

Figure 1:
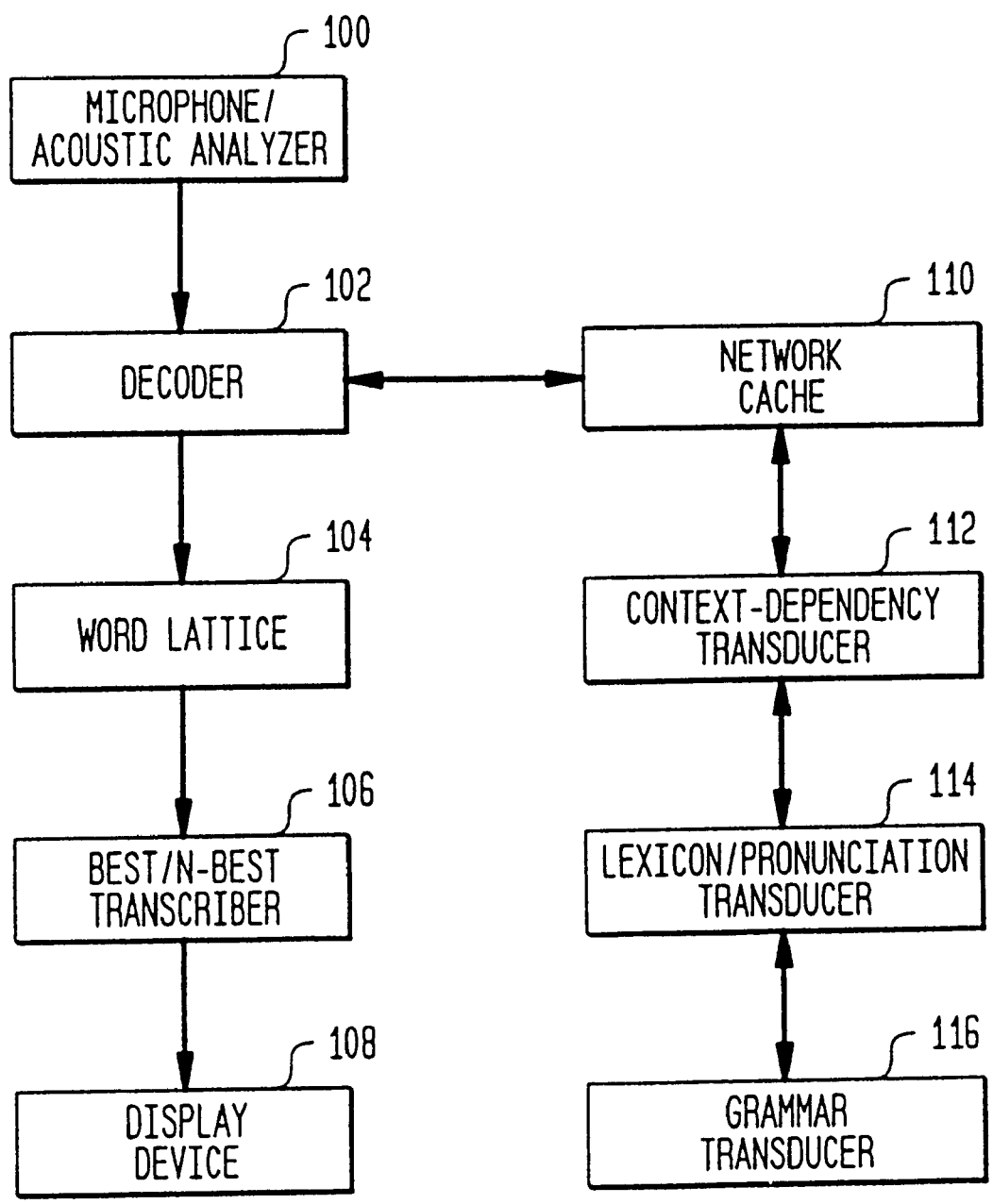
FIG. 1 is a simplified block diagram of illustrative apparatus which can be operated in accordance with this invention.

In the illustrative embodiment of speech recognition system shown in FIG. 1, speech signals are fed into microphone/acoustic analyzer 190, where it is analyzed into acoustic features. The speech signals are then passed to decoder 102 which requests a state and its outgoing transitions. Network cache 10 is first examined to see if that information has already been computed and stored in its memory (such memory being initially empty).

If so, that information from network cache 110 is returned to decoder 102. Otherwise, network cache 110 passes the request onto context-dependency transducer 112. Thereafter, decoder 102 analyzes the speech signals by utilizing the following transducers: context-dependency transducer 12, lexicon/pronunciation transducer 114 and grammar transducer 116.

Word lattice processor 104 then requests the transitions or paths leaving each state or node to formulate a graph and explores the paths and prunes out the unpromising ones (based on their acoustic and grammar match scores). This process is repeated until the final network states are reached. Best/n-best transcriber 106 then chooses the best scoring path and display device 108 displays the outcome of the recognition hypothesis.

Some components of the speech recognition system in FIG. 1 may be a microprocessor or digital signal processor ("DSP") hardware, such as the AT&T DSP 16 or DSP 32C, read-only memory "ROM" for storing software performing the operations discussed below, and random access memory ("RAM") for storing results. Very large scale integration ("VLSI") hardware embodiments, as well as a custom VLSI circuity fin combination with a general purpose DSP circuit, may also be provided.

Figure 2A:
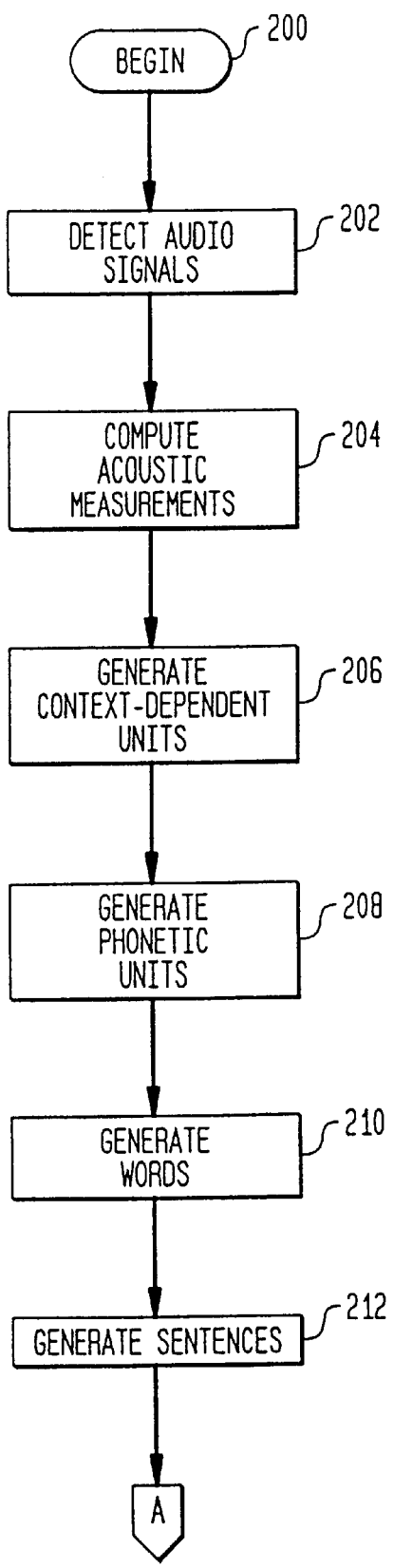
FIGS. 2a–b (collectively referred to as FIG. 2) are a flow chart of steps for carrying out an illustrative embodiment of the methods of this invention.
Figure 2B:
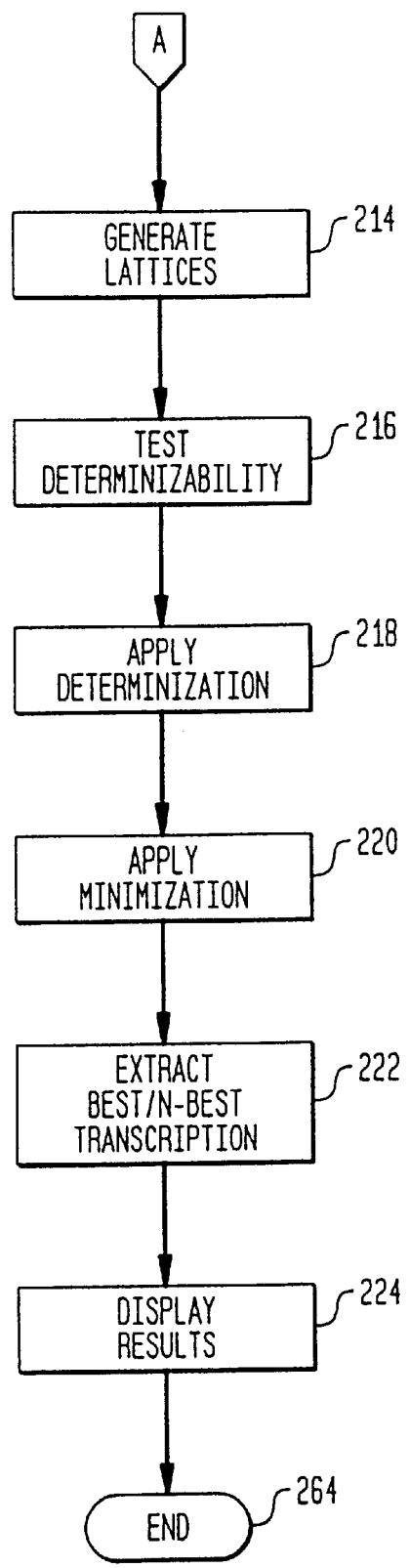

In FIG. 2, a flow chart illustrating the operations of the speech recognition system of FIG. 1 is depicted. In this illustrative example, the flow chart begins at step 200. Microphone/acoustic analyzer 100 detects audio signals at step 202 and captures their acoustic measurements at step 204. Decoder 102 (FIG. 1) receives this acoustic observation and generates context-dependency units in accordance with the appropriate context environment. For example, the context-dependency units are determined to fit naturally between their previous phone and their subsequent phone.

Context-dependency transducer 112 (FIG. 1) receives these context-dependency units from decoder 110 to generate phonetic units at step 208. Lexicon/pronunciation transducer 114 (FIG. 1) subsequently receives these phonetic units from context-dependency transducer 112 and generates words at step 210. Grammar transducer 116 (FIG. 1) finally receives these words from lexicon/pronunciation transducer 110 and generates word sequences or sentences at step 212.

Decoder 102 (FIG. 1) and word lattice processor 104 (FIG. 1) in conjunction interpret these sentences and formulate a lattice which is a weighted and directed graph at step 214. Word lattice processor 104 (FIG. 1) assigns the estimated probability that word sequences would be spoken in constructing the paths in the lattice. The lattice, thus, have nodes labeled with the word sequences and paths weighted with the probabilities. For example, the word lattice processor 104 (FIG. 1) may be connected to a database containing the probabilities of word sequences that were used in a particular literature such as Wall Street Journal so that the speech recognition system would be more effective in recognizing the speech of economists or financiers.

Word lattice processor 104 (FIG. 1) then examines the lattice to test determinizability at step 216. The determinizability determines whether the lattice is suitable for certain processing such as determinization or minimization to efficiently reshape the lattice.

If the lattice passes the determinizability test, word lattice processor 104 (FIG. 1) applies determinization in step 218 which removes redundant paths from the lattice. The theoretical basis and related algorithms for determinization will be discussed in a greater detail herein below.

Word lattice processor 104 (FIG. 1) may further apply minimization in step 220 so as to collapse lattice nodes that have the same possible combination. The theoretical basis and related algorithms for minimization will also be discussed in a greater detail herein below.

Best/n-best transcriber 106 (FIG. 1) thereafter may extract the best possible transcription at step 220. Alternatively, best/n-best transcriber 106 may extract a number of best transcriptions and reduce them to one or n transcription(s).

Display device 108 (FIG. 1) finally displays the resulted transcriptions at step 224. A viewer, therefore, may see the text of the speech being automatically typed on a monitor of display device 108 (FIG. 1). The flow chart ends in step 226.

Next several sections provide definition and algorithms that were used in determinization step 218, determinizability step 216 and minimization step 218. Thereafter, there is description of practical application of these algorithms.

2. Definition

In the following, string to weight transducers are introduced for their use in natural language processing. However, it would be apparent to those skilled in the art that the methodology of this invention is broadly applicable to a variety of other transducers including string to string transducers.

This section also considers subsequential power series in the tropical semiring that includes the functions associated with subsequential string to weight transducers. Most power series defined on the tropical semiring considered in practice are subsequential.

The string to weight transducers are used in various domains such as language modeling, representation of a word or phonetic lattice, etc. They are used in the following way: one reads and follows a path corresponding to a given input string and outputs a number obtained by combining the weight outputs along this path. In most applications of natural language processing, the weights are simply added along a path, since output label weights are interpreted as negative logarithms of probabilities. In case the transducer is not deterministic or sequential, one proceeds in the same way for all the paths corresponding to the input string and then collect all numbers obtained this way. In natural language processing and especially in speech processing, only the minimum of these numbers is kept as being relevant information. We are interested here in the use of such transducers in many applications to natural language processing involving a Hidden Markov Model ("HMM") that represents possible sequences of acoustic observations in realizations of the elementary speech units such as phones. In all such applications, one searches for the best path. This is related to the Viterbi approximation often used in speech recognition.

Specifically, the use of an efficient string to weight transducers called subsequential transducer is examined. Subsequential string to weight transducers are also called weighted automata, or weighted acceptors, or probabilistic automata, or distance automata. Not all transducers are subsequential but we define algorithms which allow one to determinize these transducers whenever possible. More precisely, we shall say that a string to weight transducer is subsequential when it is deterministic and when it is provided with a final weight function, and an initial weight. These weights are added to those encountered along a path corresponding to a given string.

Referring to FIG. 3, for instance, when used with the input string "ab.," the transducer outputs: 5+1+2+3=11, 5 being the initial and 3 being the final weight. More formally a subsequential transducer $\tau=(V, i, F, A, \delta, \sigma, \lambda, \rho)$ is an 8-tuple, where V is the set of its states, i is the initial state of V, F is the set of final states of V, A is the input to alphabet of V, $\delta$ is the state transition function which maps V×A to V, $\sigma$ is the output which maps V×A to $R_+$, $\lambda$ is the initial weight and is the final weight function mapping F to $R^+$. Unless otherwise specified, the output weights are positive real numbers.

String to weight transducers clearly realize functions mapping A* to $R_+$. A* is a sequential or p-Subsequential function, i.e., a function which can be represented by a sequential or p-subsequential transducer. Since the operations we need to consider are addition and min, and since $(R_+ \cup \{\infty\}, \min, +)$ is a semiring, we can call these functions formal power series according to the terminology used in formal languages theory. A semiring is essentially a ring which lacks negation, that is in which the first operation does not necessarily admit inverse. $(R, +, \cdot)$, and $(N \cup \{\infty\}, \min, +)$ are other examples of semiring. We shall also adopt the notations used in this field. The image by a formal power series S of a string w is denoted by (S, w) and is also called the coefficient of w in S. The notation $S=\Sigma(S, w)w$ is often used to define a power series by its coefficients. The support of S, supp(S) is the language defined by $$\mathrm{Supp}(S) = \{w \in A^* : (S, w) \neq 0\}$$

The fundamental theorem of Schützenberger, analogous of the Kleene's theorem for formal languages states that a formal power series S is rational if it is recognizable, that is realizable by a transducer with initial weights and final weights. The semiring $(R_+ \cup \{\infty\}, \min, +)$ is often distinguished from other semirings since it is involved in many optimization problems. It is called the tropical semiring which is the terminology used in principle to denote the semiring of natural integers $(N \cup \{\infty\}, \min, +)$ involved in optimization problems. Thus the functions we consider here are more precisely rational power series defined on the tropical semiring.

3. Determinization

This section introduces a theorem helping to characterize subsequential power series independently from the transducer representing them. It includes an algorithm to determinize a transducer representing a power series admitting this operation.

A distance d(u, v) on the string A*, and |s| denotes the length of the string s can be defined by:

$$d(u,v) = |u| + |v| - 2|u \wedge v|$$

where we denote by u∧v the longest common prefix of two words u and v in A*, and |S| denotes the length of strings. The definition we gave for subsequential power series depends on the notion of transducers representing them. The following theorem gives a characterization of subsequential power series which is independent of a transducer realizing them. This is an extension of the characterization theorem of Choffrut for string to string functions.

Let S be a formal rational series defined on the semiring $(R_+ \cup \{\infty\}, \min, +)$, S is subsequential if and only if it has bounded variation. For example, assume that S is subsequential. Let $\tau=(V, i, F, A, \delta, \sigma, \lambda, \rho)$ be a subsequential transducer. $\delta$ denotes the transition function associated with $\tau$, $\sigma$ denote its output function, $\lambda$ and $\rho$ denote the initial and final weight functions, q and q' states of V, and a is an input symbol of the alphabet A. Let L be the maximum of the lengths of all output labels of $\tau$:

$$L = \max_{(q,a) \in V \times A} |\sigma(q, a)|$$

and R the upper bound of all output differences at final states:

$$R = \max_{(q,q^1) \in F^2} |\rho(q) - \rho(q')|$$

and define M as M=L+R. Let $(u_1, u_2)$ be words, or more generally strings, in $(A^*)^2$. By definition of the distance d, there exists $u \in A^*$ that is a common prefix string to the strings $u_2$ and $u_2$ such that:

$$u_1 = uv_1, u_2 = uv_2, \text{ and } |v_1| + |v_2| = d(u_1, u_2)$$

where $v_1$ and $v_2$ are the remaining portions of $u_2$ and $u_2$, respectively, after the common prefix string u, and $d(u_1, u_2)$ is the distance from $u_1$ to $u_2$. Hence, $$\sigma(i,u_1)=\sigma(i,u)+\sigma(\delta(i,u),v_1)$$

$$\sigma(i,u_2)=\sigma(i,u)+\sigma(\delta((i,u),v_2)$$

Since $$|\sigma(\delta(i,u),v_1)-\sigma(\delta(i,u),v_2)|\leq L\cdot(|v_1|)+(|v_2|)=L\cdot d(u_1,u_2)$$

and $$|\rho(\delta(i,u_1))-\rho(\delta(i,u_2))|\leq R$$

we have $$|\lambda(i)+\sigma(i,u_1)+\rho(\delta(i,u_1))-\lambda+\sigma(i,u_2)+\rho(\delta(i,u_2))|\leq L\cdot d(u_1,u_2)+R$$

Notice that if $u_1 \neq u_2$, $R \leq R \cdot d(u1, u2)$. Thus $$|\lambda+\sigma(i,u_1)+\rho(\delta(i,u_1))-\lambda+\sigma(i,u_2)+\rho(\delta(i,u_2))|\leq (L+R)\cdot d(u_1,u_2)$$

Therefore:

$$\forall(u_1,u_2)\in(A^*),|(u_1)-S(u_2)|\leq M\cdot d(u_1,u_2)$$

This proves that S is M-Lipschitzian and a fortiori that it has bounded variation. This also implies in particular that the subsequential power series over the tropical semiring define continuous functions for the topology induced by the distance d on A*.

Conversely, suppose that S has bounded variation. Since S is rational, it is recognizable and therefore there exists a transducer $\tau_1=(V_{1,i1}, F_1, A, \delta_1, \sigma_1, \lambda_1, \rho_1)$ recognizing S. Here, $\tau_1$ might be non-deterministic. Therefore, the transition function $\delta_1$ maps $V_1 \times A$ to $2^{V1}$, and the output function $\tau_1$ maps $V_1 \times A \times V_1$ to $R_+$. The output of a transition from a state q to a next state to q' labeled with a, where a is a symbol of the alphabet A, is therefore denoted by $\sigma_1$ (q, a, q'). Also $\lambda_1$ is a function since $\tau_1$ might have several initial states. We shall assume that $\tau_1$ is trim and it has no non-accessible state or non-coaccessible state. Non-accessible states are those unreachable from initial states and non-coaccessible states those which admit no path to a final state. Any rational function can be represented by a trim transducer simply by removing these useless states from a transducer representing it.

The following is an algorithm to construct from the non-deterministic transducer $\tau_1$, representing S, an equivalent deterministic transducers $\tau_2=(V_2, i_2, F_2, A, \delta_2, \sigma_2, \lambda_1, \rho_2,)$. The algorithm extends to the case of transducers which output weights our determinization algorithm for string to string transducers representing p-subsequential functions as described in an article by one of the inventors (Mohri, "On some applications of finite-state automata theory to natural language processing," Technical Report ICM 94-22, Institut Gespard Monge, 1994) which is incorporated herein by reference.

FIG. 4 presents this algorithm. It describes the algorithm in the general case of a semiring $(S,\oplus,\odot,0,1)$ on which the transducer $\tau_1$ is defined, where $\Gamma$ is a summing operation, $\odot$ is a multiplying operation, "0" is the identity value for the summing operation and "1" is the identity value of the multiplying operation. Indeed, the algorithm described here applies as well to transducers representing power series defined on many other semirings. In particular, it can be verified that $(A^*\cup\{\infty\},\hat{},\cdot,\infty,\epsilon)$, where $\hat{}$ denotes the longest common prefix operation, denotes the concatenation, $\epsilon$ is the empty set, and $\infty$ denotes a new element such that for any string $w \in (A^*\cup\{\infty\}))$, $w\hat{}\infty,=\infty\hat{}w=w$ and $w\cdot\infty=\infty\cdot w=\infty$, also defines a left semiring. Considering this semiring in the algorithm of FIG. 4 gives the determinization for subsequentiable string to string transducers. The algorithm also applies to other semirings such as (R, +,·) for instance. Since the cross product of two semirings also defines a semiring, this algorithm also applies to the cross product of $(A^*\cup\{\infty\}, \hat{},\cdot,\infty,\epsilon)$ and $(R_+\cup\{\infty\}, \min, +)$. This allows one to directly determinize transducers with both weight and string outputs admitting determinization. Thus, for the purpose of the algorithm we consider here, one can replace $\oplus$ by min and $\odot$ by + in the algorithm of FIG. 4. That is $\lambda_2^{-1}$ should also be interpreted as $-\lambda$, and $[\tau_2(q_2, a)]^{-1}$ as $-\tau_2(q_2, a)$. The sets $\Gamma(q_2, a)$ $\gamma(q_2, a)$ and $v(q_2,a)$ used in the algorithm are defined by:

$$\Gamma(q_2,a)=\{(q,x)\in q_2: \exists t=(q,a,\sigma_2(t))\in E_1\}$$

$$\gamma(q_2,a)=\{(q,x,t)\in q_2 \times E_1: t=(q,a,\sigma_1(t),n_1(t))\in E_1\}$$

$$v(q_2,a)=\{q^1: \exists(q,x)\in q_2, \exists t=(q,a,\sigma_1(t),q^1)\in E_1\}$$

The algorithm is similar to the powerset construction used for the determinization of non-deterministic automata. However, since the output of two transitions bearing the same input label might differ, here one can only output the minimum of these outputs in the resulting transducer and therefore needs to keep track of the remaining weight.

Subsets are thus formed of pairs of state and weight. Notice that several transitions might reach here the same state with a priori different remaining weights. Since one is only interested in the best path corresponding to the minimum weight, one can keep the minimum of these possible distinct weights for a given state element of a subset (line 11 of the algorithm of FIG. 4).

Figure 5:
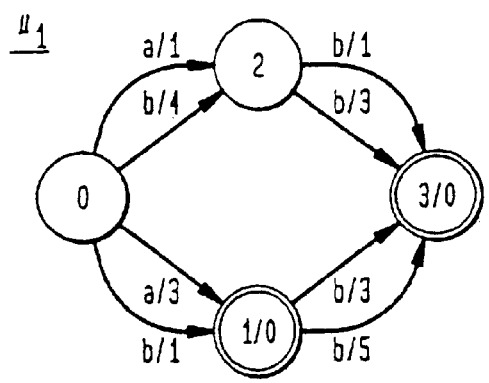
FIG. 5 is a graph of illustrative transducer $\mu_1$ representing a power series defined on $\{R_+\cup\{\infty\}, \min, +\}$.
Figure 6:
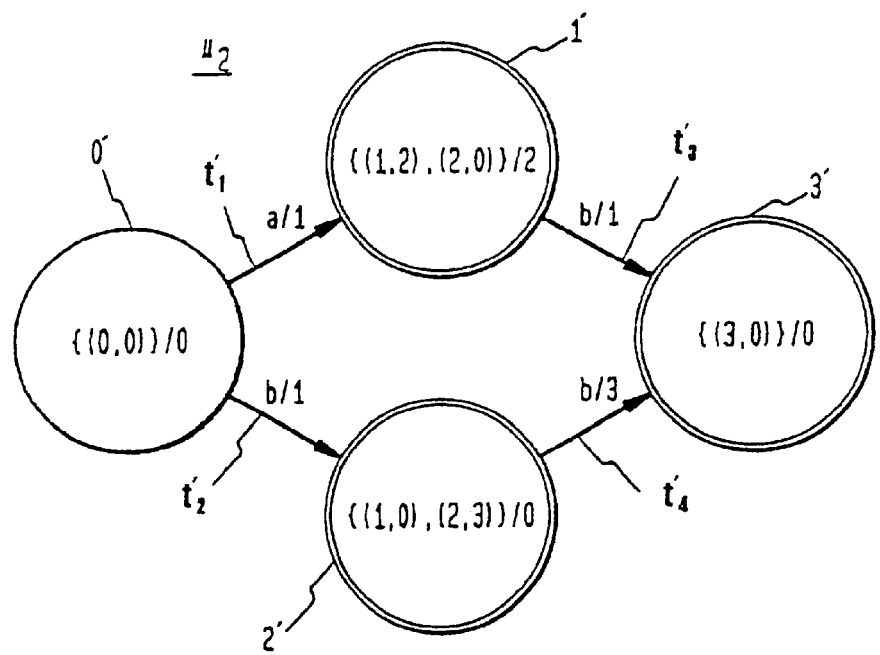
FIG. 6 is a graph of illustrative transducer $\mu_2$ obtained by power series determinization of $\mu_1$.

The algorithm is also illustrated by FIGS. 5–6. Notice that the input ab admits several outputs in $\mu_1$: {1+1=2, 1+3=4, 3+3=6, 3+5=8}. Only the smallest one) is kept in the determinized transducer $u_2$ since in the tropical semiring one is only interested in the minimum outputs for any given string. Most power series defined on the tropical semiring considered in practice are subsequential.

FIG. 5 shows a non-deterministic finite-state transducer $u_1$. As shown in FIG. 5, the non-deterministic finite-state transducer $u_1$ has four states, a start state 0, an intermediate state 2, and final states 1 and 3. In particular, given an input "a" received at the start state 0, the non-deterministic finite-state transducer $u_1$ can move from the start state 0 to the final state 1 with weight 3 or to the intermediate state 2 with weight 1. Similarly, if an input "b" is received at the start state 0, the non-deterministic finite-state transducer $u_2$ will move from the start state 0 to the final state 1 with weight 1 or to the intermediate state 2 with weight 4. Similarly, at the final state 1, when the input "b" is received, the non-deterministic finite-state transducer $u_1$ will move from the final state 1 to the final state 3 with a weight of either 3 or 5. Likewise, at the intermediate state 2, when the input "b" is received, the non-deterministic finite-state transducer $u_1$ will move from the intermediate state 2 to the final state 3 with a weight of either 1 or 3. Thus, the finite-state transducer $u_2$ is non-deterministic, because at least one state, and in this case, at states 0, 1, and 2, for a given input, there is more than one path which can be taken from that state to either different states or on different paths to the same state.

FIG. 4 is a pseudocode outlining the determinization process. In particular, starting in step 1, the final state set $F_2$ of the deterministic finite-state transducer $u_2$ to be generated is set to the empty set. Then, in steps 2 and 3, the set of initial states $i_1$ of the non-deterministic finite-state transducer $u_1$ and the minimum weight $\lambda_2$ of weights $\lambda_1$ the initial states i are used to create a single initial state $i_2$ of the deterministic finite-state transducer $u_2$. As shown in FIG. 6, this single initial state $i_2$ will have one (or more) substates, each indicating the original state i of the non-deterministic finite-state transducer $u_2$ and the difference between the weight of that original state i and the minimum weight $\lambda_2$.

Next, in step 4, the single initial state $i_2$ of the deterministic finite-state transducer $u_2$ is pushed on top of a queue Q. At this point, the queue Q contains only the single initial state $i_2$ of the deterministic finite-state transducer $u_2$. In steps 5 and 6, while the queue Q is not empty, the top state on the queue Q is popped as the current state $q_2$ of the deterministic finite-state transducer $u_2$. Next, in state 7, the current state $q_2$ is checked to determine if it contains a substate (q, x) that was a final state of the non-deterministic finite-state transducer $u_1$. If so, in step 8, the current state $q_2$ is added to the set of final states $F_2$ of the deterministic finite-state transducer $u_2$. Then, in step 9, the final output weight ρ associated with the current state $q_2$ is the minimum of the sum, for each substate q of the current state $q_2$, of the remainder x of that substate q and the final output weight ρ associated with that substate q.

In step 10, the set of transition labels a of all transitions from all substates of the current state is determined. For example, when the current state is state 0 of FIG. 5, the set of transition labels a includes "a, b". Similarly, when the current state is state 1 or state 2, the set of transition labels a includes "b". In step 10, each transition label a of the set of transition labels is selected in turn as the current label. Next, in steps 11 and 12, a new possible state of the deterministic finite-state transducer $u_2$ is created based on the states of the non-deterministic finite-state transducer $u_2$ reachable from all of the substates of the current state $q_2$ based on the current transition label. Thus, when 0 is the current state and "a" is the current transition label, the new possible state includes the substates 1 and 2. Similarly, when the current state is the state 1' of FIG. 6, the new state includes only the final state 13. In addition, creating the new possible state includes generating a new transition ($\delta_2$(q,a)) from the current state $q_2$ to the new state, determining the weight ($\delta_2$(q,a)) of that new transition and determining the remainders x associated with each of the substates q of the possible new state.

In step 13, the new possible state is checked to determine if it is identical to some previously determinized state in the deterministic finite-state transducer $u_2$ being created. That is, in step 13, the new state is checked to determine it is the same state as some old state. To be the same state, the transitions and the substates q of the new state must be identical to the transitions and the substates q of the old state, and the remainders on each of the substates q must be same as the remainders on each of the corresponding substates q of the old state. In step 14, if the new state is truly new, in that it is not identical to some old state, the new state is pushed onto the queue Q.

Steps 10–14 are repeated for each transition label a until the set of transition labels is empty. If the set of transitions is empty, then all of the transitions from all of the substates q of the current state $q_2$ have been determinized and no further analysis of the current state $q_2$ is necessary. In step 15 the current state $q_2$ is removed from the queue Q. Steps 6–15 are then repeated until the queue Q is empty.

In steps 11 and 12, a possible new state is created based on the substates q, if any, of the current state $q_2$ using the current transition label a. In step 11, the weight $\tau_2(q_2,a)$ of the current transition label a is determined as the minimum, for each transition between a substate q of the current state $q_2$ and a next state q' having the current transition label a, of the weight $\sigma_1$ of that transition plus the remainder x of the current substate q.

Applying the determinization method outlined in FIG. 4 to the non-deterministic finite-state transducer $u_1$ shown in FIG. 5 generates the deterministic finite-state transducer $u_2$ shown in FIG. 6. First, the start state 0' of the deterministic finite-state transducer $u_2$ is pushed onto a stack queue Q. While the queue Q is not empty, the top state of the queue Q is popped from the queue Q. From the initial state 0 of the non-deterministic finite-state transducer $u_1$ shown in FIG. 5, the states 1 and 2 can be reached using the input symbol "a". Thus, a new state 1'=[(1,x), (2,x)] reachable from the current state 0'(=[(0,0)]) of the deterministic finite-state transducer $u_2$ with the input symbol "a" is established with a new transition $t_1$'=[0',a,ρ,1']. The weight ρ for the new transition $t_1$' is the minimum weight of the transitions labeled "a" from the start state 0 to either of the reachable states 1 or 2, plus any remainder that may be assigned to a corresponding substate of the current state 0'. Because the current state 0' is a start state, there is no remainder. Similarly, because the non-deterministic finite-state transducer $u_1$ shown in FIG. 5 has only a single start state, there is only one substate of the current state 0'.

As shown in FIG. 5, the transition labeled "a" from the start state 0 to the state 2 has the minimum weight, 1. Thus, the weight p for the transition $t_1$' is 1. Because the weight assigned to the new transition $t_1$' does not capture the full weight of the other a-labeled transition from the start state 0 to the state 1, each of the substates 1 and 2 of the new state 1' are assigned remainders x. In particular, the remainder for the substate 1 is 2, while the remainder for the substate 2 is zero. Thus, the new state 1' is rewritten as [(1,2),(2,0)].

Additionally, because state 1 is a final state, any state of the deterministic finite-state transducer $u_2$ will be a final state, and will have an output value. As indicated above, the minimum output weight for an input of "ab" is 2. This weight is output from state 1', as shown in FIG. 6

Similarly, from the start state 0 in the original non-deterministic finite-state transducer $u_1$ shown in FIG. 5, states 1 and 2 can also be reached from the current state 0' using the input symbol "b". Another new state 2' is formed, and a new transition $t_2$' is formed from the current state 0' to the new state 2'. The new transition $t_2$' is again assigned a weight which is equal to the minimum weight of the b-labeled transitions from the current state 0' to the substates of the new state 2'. Likewise, each of the substates of the new state 2' are assigned remainder weights. This is also shown in FIG. 6.

Because each of the new states 1' and 2' is not identical to any other previously determinized, or old, state, each of the new states 1' and 2' are added to the queue Q. Because all of the transitions from the current state 0' have now been analyzed and determinized, the new state 1' is popped from the queue Q. In particular, the current state 1' has two substates 1 and 2. Each of these substates 1 and 2 in the original non-deterministic finite-state transducer $u_1$ shown in FIG. 5 has multiple exiting transitions, but each such transition is labeled with the same label "b". Furthermore, each of these transitions moves to the final state 3. Thus, in the non-deterministic finite-state transducer $u_1$ shown in FIG. 5, the final state 3 can be reached from both the substates 1 and 2 of the current state 1' using the input symbol "b". In addition, there are two such b-labeled transitions from each of the substates 1 and 2. For each such original transition, a transition weight $\Sigma_t$ for each transition is determined as the sum of the weight assigned to that transition and the remainder associated with the original substate corresponding to that transition in the current state 1'. The weight to be associated with the new transition from the current state 1' to the new state 3' is then the minimum of the transition weights $\rho_r$. In particular, the minimum transition weight $P_r$ for the new state 3' is 1. Since there is only one reachable state for the input table "b" for the current state 1', the minimum weight $\rho$ for the b-labeled transition for the current state 1' is 1.

The minimum transition weight $\rho$ is then used as the weight for a new transition $t_3$' from the current state 1' to the new state 3'. Because there is only one reachable state, the final state 3, reachable in the original non-deterministic finite-state transducer $u_2$ shown in FIG. 5 from the current state 1', the new state established from the current state 1' reachable using the input symbol b is 3'=[(3,x)]. Using the same procedure, a transition $t_4$' from the state 2' to the state 3' can be formed having a weight of 3. This is shown in FIG. 6. The remainder on the new state 3' is the minimum remainder resulting from the remainders obtained by adding the remainders in the states 1' and 2' and the weights on the corresponding original transitions in the non-deterministic finite-state transducer $u_1$, less the weight on the corresponding new transitions $t_3$' and $t_4$'. Accordingly, this new state 3' thus has a remainder of zero, resulting in the complete new state 3'=[(3,0)]. The end result is thus shown in FIG. 6.

Generally when the determinization algorithm terminates, the resulting transducer $\tau_2$ is equivalent to $\tau_1$. For example, if $\theta_1$ (q, w, q') denotes the minimum of the outputs of all paths from q to q', by construction, line 2 of FIG. 4 becomes:

$$\lambda_2 = \min \lambda_1(i_1) \quad i_1 \in I_1$$

Further, if the residual output associated to q in the subset $\delta_2(i_2, w)$ is defined as the weight c (q, w) associated to the pair containing q in $\delta_2(i_2, w)$, it is not hard to show by induction on $|w|$ that the subsets constructed by the algorithm are the sets $\delta_2(i_2, w)$, w∈A*, such that:

$$\forall wA^*, \delta_2(i_2, \omega) = \bigcup_{q \in \delta_1(I_1, w)} \{q, c(q, w)\}$$

$$c(q, \omega) = \min_{i_1 \in I_1} (\lambda_1(i_1) + \theta_1(i_1, \omega, q)) - \sigma_2(i_2, \omega) - \lambda_2$$

$$\sigma_2(i_2, \omega) = \min_{q \in \delta_1(I_1, \omega)} (\lambda_1(i_1) + \theta_1(i_1, \omega, q)) - \lambda_2$$

Notice that the size of a subset never exceeds $|V_1|$: card $(\delta_{2(i2, w)}) \leq |V_1|$. A state q belongs at most to one pair of a subset since for all paths reaching q, only the minimum of the residual outputs is kept. Notice also that, by definition of min, in any subset there exists at least one state q with a residual output c (q, w) equal to 0.

A string w is accepted by a if and only if there exists $q \in F_1$ such that $q \in \delta_1 (i_1, w)$. Using the equations set above, it is accepted if and only if $\delta_2(i_2, w)$ contains a pair (q, c (q, w)) with $q \in F_1$. This is exactly the definition of the final states $F_2$ in line 7 of FIG. 4. So $\tau_1$ and $\tau_2$ accept the same set of strings.

Let w∈A* be a string accepted by $\tau_1$ and $\tau_2$. The definition of $\rho_2$ in the algorithm of line 9 of FIG. 4 gives:

$$\rho_2(\delta_2(i_2, \omega)) = \min_{q \in \delta_1(I_1, \omega) \cap F_1} \rho_1(q) + \min_{i_1 \in I_1} (\lambda_1(i_1) + \theta_1(i_1, \omega, q)) - \sigma_2(i_2, \omega) - \lambda_2$$

Thus, if we denote by S the power series realized by $\tau_1$, we have:

$$\rho_2(\delta_2(i_2, w)) = (S, w) - \tau_2(i_2, w) - \lambda_2$$

Hence: $\lambda_2 + \delta_2(i_2, w) + \rho_2(\delta_2(i_2, w)) = (S, w)$

Let T=(Q, Σ, I, F, E, λ, ρ) be a string-to-weight transducer, $$\pi \in \rho \xrightarrow{w} q$$

a path in T from the state $\rho \in Q$ to $q \in Q$, and $$\pi' \in \rho' \xrightarrow{w} q'$$

a path from p'∈Q to q'∈Q both labeled with the input string w∈Σ*. Assume that the lengths of π and π' are greater than $|Q|^2 - 1$, then there exists string $u_2, u_2, u_3$ in Σ*, and states $p_1$, $p_2$, $p'_1$, and $p'_2$ such that $|u_2|>0$, $u_1 u_2 u_3 = w$ and such that π and π' be factored in the following way:

$$\pi \in p \xrightarrow{u_1} p'_1 \xrightarrow{u_2} p_1 \xrightarrow{u_3} q$$

$$\pi' \in p' \xrightarrow{u_1} p'_1 \xrightarrow{u_2} p'_1 \xrightarrow{u_3} q'$$

Given two transducers $T_1 = (Q_1, \Sigma, I_1, F_1, E_1, \lambda_1, \rho_1)$ and $T_2 = (Q_2, \Sigma, I_2, F_2, E_2, \lambda_2, \rho_2)$, the cross product of $T_1$ and $T_2$ may be defined as the transducer:

$$T_1 \times T_2 = (Q_1 \times Q_2, \Sigma, I_1 \times I_2, F_1 \times F_2, E, \lambda, \rho)$$

with outputs in $R_+ \times R_+$ such that $t=((q_1, q_2), a, (x_1, x_2), (q'_1, q'_2)) \in Q_1 \times \Sigma \times R_+ \times R_+ \times Q_2$ is transition of $T_1 \times T_2$, namely t∈E, if and only if $(q_1, a, x_1, q'_1) \in E_1$ and $(q_2, a, x_2, q'_2) \in E_2$. λ and ρ can be also defined by: $\forall (i_1, i_2) \in I_1 \times I_2, \lambda(i_1, i_2) = (\lambda(i_1), \lambda_2(i_2)), \forall (f_1, f_2) \in F_1 \times F_2, \rho(f_1, f_2) = (\rho_1(f_1), \rho_2(f_2))$.

Consider the cross product of T with itself, T×T. Let π and π' be two paths in greater than $|Q|^2 31 \ 1$, $(m > |Q|^2 - 1)$:

$$\pi = ((p = q_0, a_0, x_0, q_1), \ldots, (q_{m-1}, a_{m-1}, x_{m-1}, q_m = q))$$

$$\pi' = ((p' = q'_0, a'_0, x'^0, q'_1), \ldots, (q'_{m-1}, a_{m-1}, x'_{m-1}, q'_m = q'))$$

then:

$$\Pi = (((q_0, q'_0), a_0, (x_0, x'_0), q_1, q'_1)), \ldots, ((q_{m-1}, q'_{m-1}, a_{m-1}, (x_{m-1}, x'_{m-1}), (q_m, q'_m)))$$

a path in T×T with length greater than $|Q|^2 - 1$. Since T×T has exactly $|Q|^2$ states, Π admits at least one cycle at some state $(p_1, p'_1)$ labeled with a non empty input string $u_2$. This shows the existence of the factorization above.

Let $\tau_1 = (Q_1, \Sigma, I_1, F_1, E_1, \lambda_1, \rho_1)$ be a string-to-weight transducer defined on the tropical semiring. If $\tau_1$ has the twins property then it is determinizable. For example, assume that τ has the twins property. If the determinization algorithm does not halt, there exists at least one subset of $2^Q$, $\{q_0, \ldots, q_m\}$, such that the algorithm generates an infinite number of distinct weighted subsets $\{(q_0, c_0), \ldots, (q_m, c_m)\}$.

Then it is necessarily m>1. Indeed, as previously mentioned, in any subset there exists at least one state $q_1$ with a residual output $c_1 = 0$. If the subset contains only one state $q_0$, then $c_0 = 0$. So there cannot be an infinite number of distinct subsets $\{(q_0, c_0)\}$.

Let $W \subseteq \Sigma^*$ be the set of strings w such that the states of $\delta_2(i_2, w)$ be $\{q_0, \ldots, q_m\}$. We have: $\forall \omega \in A, \delta_2(i_2, \omega) = \{(q_0, c(q_0, \omega)), \ldots, (q_m, c(q_m, \omega))\}$. Since W is infinite, and since in each weighted subset there exists a null residual output, there exist $i_0$, $0 < i_0 < m$, such that $c(q_{10}, \omega) = 0$ for an infinite number of strings ω∈W. Without loss of generality, it can be assumed that $i_0 = 0$.

Let $B \subseteq W$ be the infinite set of strings $\omega$ for which $c(q_0, \omega)=0$. Since the number of subsets $\{(q_0, c(q_0, \omega)), \ldots, (q_m, c(q_m, \omega))\}$, $\omega \in B$, is infinite, there exists $j$, $0 < j \leq m$, such that $c(q_j, \omega)$ be distinct for an infinite number of strings $\omega \in B$. Without loss of generality, $j=1$ can be assumed.

Let $C \subseteq B$ be an infinite set of strings $\omega$ with $c(q_1, \omega)$ all distinct. $(q_0, q_1)$ can be defined as the finite set of differences of the weights of paths leading to $q_1$ and $q_1$ labeled with the same string $\omega$, $|\omega| \leq |Q_1|^2 - 1$:

$$R(q_0, q_1) = \{(\lambda(i_1) + \sigma(\pi_1)) - (\lambda(i_0) + \sigma(\pi_0)): \pi_0 \in i_0 \xrightarrow{\omega} q_0,$$

$$\pi_1 \in i_1 \xrightarrow{\omega} q_1, i_0 \in I, i_1 \in I, |\omega| \leq |Q_1|^2 - 1\}$$

It can be shown that $\{c(q_1, \omega): \omega \in C\} \subseteq R(q_0, q_1)$. This will yield a contradiction with the infinity of C, and will therefore prove that the algorithm terminates.

Let $\omega \in C$, and consider a shortest path $\pi_0$ from a state $i_0 \in I$ to $q_0$ labeled with the input string $\omega$ and with total cost $\sigma(\pi_0)$. Similarly, consider a shortest path $\pi_1$ from $i_1 \in I$ to $q_1$ labeled with the input string $\omega$ and with total cost $\sigma(\pi_1)$. By definition of the subset construction we have: $(\lambda(i_1)+\sigma(\pi_1))-(\lambda(i_0)+\sigma(\pi_0))=c(q_1, \omega)$. Assuming that $|\omega|>|Q|^2-1$, there exists a factorization of $\pi_0$ and $\pi_1$ of the type:

$$\pi_0 \in i_0 \xrightarrow{u_1} p_0 \xrightarrow{u_2} p_0 \xrightarrow{u_3} q_0$$

$$\pi_1 \in i_1 \xrightarrow{u_1} p_1 \xrightarrow{u_2} p_1 \xrightarrow{u_3} q_1$$

with $|u_2|>0$. Since $p_0$ and $p_1$ are twins, $\theta_1(p_0, u_2, p_0)=\theta_1(p_1, u_2, p_1)$. $\pi'_0$ and $\pi'_1$ may be defined by:

$$\pi'_0 \in i_0 \xrightarrow{u_1} p_0 \xrightarrow{u_2} q_0$$

$$\pi'_1 \in i_1 \xrightarrow{u_1} p_1 \xrightarrow{u_2} q_1$$

Since $\pi$ and $\pi'$ are shortest paths, $\sigma(\pi^0)=\sigma(\pi'_0)+\theta_1(p_0, u_2, p_0)$ and $\sigma(\Pi_1)=(\sigma(\pi_1)+\theta_1(p_1, u_2, p_1)$. Therefore: $(\lambda(i_1)+\sigma(\pi'_1))-(\lambda(i_0)+\sigma(\pi'_0))=c(q_1, \omega)$. By induction on $|\omega|$, the shortest paths $\Pi_0$ and $\Pi_1$ from $i_0$ to $q_0$ (resp. $i_1$ to $q_1$) can be found with length less or equal to $|Q_1|^2-1$ and such that $(\lambda(i_1+\sigma(\Pi_1))-(\lambda(i_0)+\sigma(\Pi_0))=c(q_1, \omega)$. Since $\sigma(\Pi_1)-\sigma(\Pi_0) \in R(q_0, q_1)$, $c(q_1, \omega) \in R(q_0, q_1)$, and C is finite.

There are transducers that do not have the twins property and that are still determinizable. To characterize such transducers one needs more complex conditions. Those conditions are not described in this application. However, in the case of trim unambiguous transducers, the twins property provides a characterization of determinizable transducers.

Let $\tau_1=(Q_1, \Sigma, I_1, F_1, E_1, \lambda_1, \rho_1)$ be a trim unambiguous string-to-weight transducer defined on the tropical semiring. Then $\tau_1$ is determinizable if and only if it has the twins property.

For example, if $\tau_1$ has the twins property, then it is determinizable. Assume now that $\tau$ does not have the twins property, then there exist at least two states q and q' in Q that are not twins. There exists $(u, v) \in \Sigma^*$ such that: $(\{q, q'\} \subseteq \delta_1(I, u)$, $q \in \delta(q, v)$, $q' \in \delta_1(q', v))$ and $\theta_1(q, v, q) \neq \theta_1(q', v, q')$. Consider the weighted subsets $\delta_2(i_{2, uv}^k)$, with $k \in N$, constructed by the determinization algorithm. A subset $\delta_2(i_{2, uv}^k)$ contains the pairs $(q, c(q, uv^k))$ and $(q', c(q', uv^k))$. It can be shown that these subsets are all distinct. The determinization algorithm, therefore, does not terminate if $\tau_1$ does not have the twins property.

Since $\tau_1$ is a trim unambiguous transducer, there exists only one path in $\tau_1$ from I to q or to q' with input string u.

Similarly, the cycles at q and q' labeled with v are unique. Thus, there exist $i \in I$ and $i' \in I$ such that:

$$\forall k \in N, c(q, uv^k) = \lambda_1(i) + \theta_1$$

$$(i, u, q) + k\theta_1(q, v, q) - \sigma_2(i_2, uv^k) - \lambda_2$$

$$\forall k \in N, c(q', uv^k) = \lambda_1(i') + \theta_1(q', u, q') + k\theta_1(q', v, q') - \sigma_2(i_2, uv^k) - \lambda_2$$

Let $\lambda$ and $\theta$ be defined by:

$$\lambda = (\lambda_1(i') - \lambda_1(i)) + (\theta$$

$$1(i', u, q') - \theta_1(i, u, q))$$

$$\theta = \theta_1(q', v, q') - \theta_1(q, v, q)$$

We have:

$$\forall k \in N, c'_k - c_k = \lambda + k\theta$$

Since $\theta \neq 0$, this equation shows that the subsets $\delta_2(i_{2, uv}^k)$ are all distinct.

Notice that the power series determinization algorithm is equivalent to the usual determinization of automata when all output labels are equal to 0, and all final weights equal to 0. The corresponding power series is then the characteristic function of its support supp (S) and represents exactly a regular language. The subsets considered in the algorithm are then exactly those obtained in the powerset determination of automata, the remainder output being constant and equal to 0.

Both space and time complexity of the determinization algorithm for automata is exponential. There are minimal deterministic automata with an exponential size with respect to non-deterministic ones representing them. A fortiori the complexity of the determinization algorithm in the weighted case we just described is also exponential. However, in some cases in which the degree of non-determinism of their initial transducer is high, the determinization algorithm appears as fast and the resulting transducer has fewer number of states than the initial one. Such cases which appear in speech recognition are discussed here. Also presented is a minimization algorithm which allows one to reduce the size of subsequential transducers representing power series.

The complexity of the application of subsequential transducers is linear in the size of the string to which they apply. This property makes it interesting to use the power series determinization in order to speed up the application of transducers. However, since the algorithm only applies to subsequential power series, we need an algorithm to test this property. The following section is devoted to the definition of such an algorithm.

4. Test of Determinizability

The characterization of determinizable transducers described in section 3 herein above leads to the definition of an algorithm for testing the determinizability of trim unambiguous transducers. Before describing the algorithm, it is shown that it suffices to examine a finite number of paths to test the twins property.

For example, let $\tau_1=(Q_1, \Sigma, I_1, F_1, E_1, \lambda_1, \rho_1)$ be a trim unambiguous string-to-weight transducer defined on the tropical semiring. $\tau_1$ has the twins property if and only if $$\forall (u,v) \in (\Sigma^*)^2, |uv| \leq 2|Q_1|^2-1, (q',v)) \rightarrow \theta_1(q,v,q) = \theta_1(q',v,q')$$

Clearly if $\tau_1$ has the twins property, then the above equation holds. Conversely, if the above equation holds, then it also holds for any $(u,v) \in (\Sigma^*)^2$, by induction on $|uv|$.

Consider $(u, v) \in (\Sigma^*)^2$ and $(q, q') \in |Q_1|^2$ such that: $\{q, q'\} \subset \delta_1$ $(q, v)$, $q' \in \delta_1(q', v)$. Assume that $|uv|>2|Q_1|^2-1$ with $|v|>0$. Then either $|u|>|Q_1|^2-1$ or $|v|>|Q_1|^2-1$.

Assume that $|u|>|Q_1|^2-1$. Since $\tau_1$ is a trim unambiguous transducer there exists a unique path $\pi$ in $\tau_1$ from $i \in I$ to $q$ labeled with the input string u, and a unique path $\pi$ from $i' \in I$ to $q'$. In view of above equation, there exist strings $u_1, u_2, u_3$ in $\Sigma^*$, and states $p_1, p_2, p'_1$), and $p_2$ such that $|u_2|>0$, $u_1 u_2 u_3 = u$ and such that $\pi$ and $\pi'$ be factored in the following way:

$$\pi \in i \xrightarrow{u_1} p_1 \xrightarrow{u_2} p_1 \xrightarrow{u_3} q$$

$$\pi \in i' \xrightarrow{u_1} p'_1 \xrightarrow{u_2} p'_1 \xrightarrow{u_3} q'$$

Since $|u_1 u_2 v|<|uv|$, by induction $\theta_1(q, v, q)=\theta_1(q', v, q')$.

Next, assume that $|v|>|Q_1|^2-1$. Then, there exist strings $v_1, v_2, v_3$ in $\Sigma^*$, and states $q_1, q_2, q'_1$, and $q'_2$ such that $|v|>0$, $v_1 v_2 v_3 = v$ and such that $\pi$ and $\pi'$ be factor following way:

$$\pi \in q \xrightarrow{u_1} q_1 \xrightarrow{u_2} q_1 \xrightarrow{u_3} q$$

$$\pi' \in q' \xrightarrow{u_1} q'_1 \xrightarrow{u_2} q'_1 \xrightarrow{u_3} q'$$

Since $|uv_{1,3}|<|uv|$, by induction, $\theta_1(q, v_1 v_3, q)=\theta_1(q', v_1 v_3, q')$. Similarly, since $|uv_1 v_2|<|uv|$, $\theta_1(q_1, v_2, q_1)=\theta_1(q'_1, v_2, q'_1)$. $\tau_1$ is a trim unambiguous transducer, so:

$$\theta_1(q,v,q)=\theta_1(q,v_1v_3,q)+\theta_1(q_1,v_2,q_1)$$

$$\theta_1(q',v,q')=\theta_1(q',v_1v_3,q')+\theta_1(q'_1,v_2,q'_1)$$

Thus, $\theta_1(q, v, q)=\theta_1(q^1, v, q')$.

If $\tau_1=(Q_1, \Sigma, I_1, F_1, E_1, \lambda_1, \rho_1)$ is a trim unambiguous string-to-weight transducer defined on the tropical semiring, then there exists an algorithm to test the determinizability of $\tau_1$.

For example, testing the determinizability of $\tau_1$ is equivalent to testing for the twins property. An algorithm to test this property is defined, specifically for testing the sequentiability of string-to-string transducers. It is based on the construction of an automaton $A=(Q, I, F, E)$ similar to the cross product of $\tau_1$ with itself.

Let $K \subset R$ be the finite set of real numbers defined by:

$$K = \left\{ \sum_{i=1}^{k} (\sigma(t'_i) - \sigma(t_i)) : 1 \leq k \leq 2|Q_1|^2 - 1, \forall i \leq k(t_i, t'_i) \in E_1^2 \right\}$$

A can be defined by the following:
The set of states of A is defined by $Q=Q_1 \times Q_1 \times K$,
The set of initial states by $I=I_1 \times I_1 \times \{0\}$
The set of final states by $F=F_1 \times F_1 \times K$,
The set of transitions by:

$$E=\{((q_1,q_2,c),a,(q'_1,q'_2,c')) \in Q \times \Sigma \times Q: \exists (q_1,a,l,q_2) \in E_1, (q'_1,a,l'q'_2) \in E_1, c'-c=x'-x\}$$

By construction, two states $q_1$ and $q_2$ of Q can be reached by the same string u, $|u| \leq 2|Q_1|^2 - 1$ and only if there exists $c \in K$ such that $(q_1, q_2, c)$ can be reached from I in A. the set of such $(q_1, q_2, c)$ is exactly the transitive closure of I in A. The transitive closure of I can in time linear in the size of A, $O(|Q|+|E|)$.

Two such states $q_1$ and $q_2$ are not twins if and only if there exists a path in A from $(q_1, q_2, 0)$ to $(q_1, q_2, c)$, with $c \neq 0$. Indeed, this is exactly equivalent to the existence of cycles at $q_1$ and $q_2$ with the same input label and distinct output weights and it suffices to test the twins property for strings of length less than $2|Q_1|^2-1$. So the following gives an algorithm to test the twins property of a transducer $\tau_1$:

1. Compute the transitive closure of I:T (I).
2. Determine the set of pairs $(q_1, q_2)$ of T (I) with distinct states $q_1 \neq q_2$.
3. For each such $\{q_1, q_2\}$ compute the transitive closure of $(q_1, q_2, 0)$ in A. If it contains $(q_1, q_2, c)$ with $c \neq 0$, then $T_1$ does not have the twins property.

The operations used in the algorithm (computation of the transitive closure, determination of the set of states) can all be done in polynomial time with respect to the size of A, using classical algorithms.

This provides an algorithm for testing the twins property of an unambiguous trim transducer T. It is very useful when one knows T to be unambiguous.

In many practical cases, the transducer one wishes to determine is ambiguous. It is always possible to construct an unambiguous transducer T' from T. The complexity of such a construction is exponential in the worst case. Thus the overall complexity of the test of determinizability is also exponential in the worst case.

Notice that if one wishes to construct the result of the determinization of T for a given input string w, one does not need to expand the whole result of the determinization, but only the necessary part of the determinized transducer. When restricted to a finite set the function realized by any transducer is subsequentiable since it has bounded variation. Acyclic transducers have the twins property, so they are determinizable. Therefore, it is always possible to expand the result of the determinization algorithm for a finite set of input strings, even if T is not determinizable.

5. Minimization

This section presents a minimization algorithm which applies to subsequential string to weight transducers. The algorithm is very efficient. The determinization algorithm can also be used in many cases to minimize a subsequential transducer.

A minimization algorithm for subsequential power series is defined on the tropical semiring which extends the algorithm defined by an article by one of the inventors (Mohri, "Minimization of sequential transducer," Lecture Notes in Computer Science 4, 1994, Institut Gaspard Monge, Université Marne la Vallée) in the case of string to string transducers. This article is incorporated herein by reference. An algorithm allowing one to minimize the representation of power series was defined by Schützenberger. However, Schützenberger's algorithm only applies when the semiring considered is a field. Thus, it does not apply to the tropical semiring. Our minimization algorithm applies to subsequential power series defined on other semirings, in particular to those defined on (R, +, .) for which the algorithm by Schützenberger was defined.

For any subset L of a finite set A* of the alphabet A (or of a fininte set $\Sigma^*$ of the alphabet $\Sigma$) and any string u we define $u^{-1}$ L by:

$$u^{-1}L=\{w:uw \in L\}$$

Recall that L is a regular language if and only if there exists a finite number of distinct $u^{-1}$ L. In a similar way, given a power series S we define a new power series $u^{-1}$ S by:

$$u^{-1}S=\Sigma(S,uw)w \omega \in A^*$$

One can prove that S is a rational power series if and only if it admits a finite number of independents $u^{-1}$ S. This is the equivalent for power series of the Nerode's theorem for regular languages.

For any subsequential power series S, we can now define the following relation on $A^*$:

$$\forall (u,v) \in A^*, uR_s v \Leftrightarrow \exists k \in R, (u^{-1}\mathrm{supp}(S) = v^{-1}\mathrm{supp}(S)) \text{ and, } ([u^{-1}S] - v^{-1}S]/u^{-1}\mathrm{supp}(S) = K$$

It is easy to show that Rs is an equivalence relation. $u^{-1}$ supp (S)=$v^{-1}$ supp (S)) defines the equivalence relation for regular languages. $R_s$ is a finer relation. The additional condition in the definition of $R_s$ is that the restriction of the power series $[u^{-1}S - v^{-1}S]$ to $u^{-1}$supp (S)=$v^{-1}$supp (S) is constant. The following shows that if there exists a subsequent transducer T computing S with a number of states equal to the number of equivalence classes of $R_s$, then T is a minimal transducer computing f.

For example if there is a subsequent power series defined on the tropical semiring, $R_s$ has a finite number of equivalence classes. This number is bounded by the number of states of any subsequent transducer realizing S. For example, let $T=(V, i, F, A, \delta, \tau, \lambda, \rho)$ be a subsequent transducer realizing S. Clearly, $$V(u;v)E(A^*)2, \delta(i,u) = \delta(i,v) \Rightarrow \forall \epsilon u^{-1}\mathrm{supp}(S), \delta(i,uw) \in F \Leftrightarrow \delta(i,vw) \in F$$

Also, if $u^{-1}$supp(S)=$v^{-1}$supp(S),$\forall (u,v) \in (A^*)^2$, $\delta(i,u) = \delta(i,v) = \Rightarrow \forall w \in u^{-1}\mathrm{supp}(S), (S,uw) - (S,uw) = \tau(i,u) - \tau(i,v) \Leftrightarrow [u^{-1}S - v^{-1}S]/u^{-1}\mathrm{supp}(S) = b(i,u) - b(i,v)$ The existence of a minimal subsequent transducer representing S may be shown. For any sequential function S, there exists a minimal subsequent transducer computing it. Its number of states is equal to the index of $R_s$. For instance, given a subsequent series S, a series f may be defined by:

$$\forall u \in A^*, u^{-1}\mathrm{supp}(S) \neq 0 \quad \min_{\omega \in A^*, u\omega \in \mathrm{supp}(S)} (S, u\omega)$$

A subsequent transducer $T=(V, i, F, A, \delta\sigma, \lambda, \rho)$ may then d defined by:

$V=\{\overline{u}:u \in A^*\}$;
$i=\overline{\epsilon}$;
$F=\{\overline{u}:u \in A^* \cap \mathrm{supp}(S)\}$;
$\forall u \in A^*, \forall a \in A, \delta(\overline{u}, a) = \overline{ua}$;
$\forall u \in A^*, \forall a \in A, \delta(\overline{u}, a) = (f, ua) - (f, u)$;
$\lambda = (f, \epsilon)$;
$\forall q \in V, p(q) = 0$, where we denote by $\overline{u}$ the equivalence class of $u \in A^*$.

Since the index of $R_s$ is finite, V and F are well defined. The definition of $\delta$ does not depend on the choice of the element u in $\overline{u}$ since for any $a \in A$, u $R_s$ v implies (ua) $R_s$ (va). The definition of $\sigma$ is also independent of this choice since by definition of $R_s$, if $uR_sv$, then (ua) $R_s$ (va) and there exists $k \in R$ such that $\forall w \in A^*$, (S, uaw)−(S, vaw)=(S, uw)−(S, vw)=k. Notice that the definition of $\sigma$ implies that:

$$\forall w \in A^*, \tau(i,w) = (f,w) - (f,\epsilon)$$

Thus, T realizes S:

$\forall w \in \mathrm{supp}(S)$,

-continued $$\lambda + (f, w) - (f, \epsilon) + p(q) = (f, w) \min_{w' \in A^*, ww' \in \mathrm{supp}(S)} (S, ww') = (S, w)$$

Given a subsequential transducer $T=(V, i, F, A, \delta, \sigma, \lambda, \rho)$, each state $q \in V$, d(q) can be defined by:

$$d(q) = \min_{\delta(q,w) \in F} (\sigma(q, w) + \rho(\delta(q, w)))$$

A new operation of pushing can be defined which applies to any transducer T. In particular, if T is subsequential and the result of the application of pushing to T is a new subsequential transducer $T' = (V, i, F, A, \delta, \sigma, \lambda, \rho)$ which only differs from T by its output following way:

$\lambda' = \lambda + d(i)$;
$\forall (q, a) \in V \times A, \sigma'(q, a) = \sigma(\sigma, a) + d(\delta(q, a)) - d(q)$;
$\forall q \in V, \rho'(q) = 0$.
Since $d(\delta(q, a)) - d(q) + \sigma(q, a) \geq 0$, T' is well defined.

T' be the transducer obtained from T by pushing. T' is a subsequential transducer which realizes the same function as T. Also, $$\forall w \in A^*, q \in V, \tau'(q,w) = \sigma(q,w) + d(\delta(q,w)) - d(q)$$

Therefore, since $\delta(i,w) \in F \Rightarrow d(\delta(i,w)) = \rho(\delta(i,w))$, $$\lambda' + \sigma' - (i, w) + p'(\delta(i,w)) = \lambda d(i) + \sigma(q,w) + \rho(\delta(i,w)) - d(i) + 0$$

The following defines the minimization algorithm.

Let T be a subsequential transducer realizing a power series on the tropical semiring. Then applying the following two operations:

pushing automata minimization leads to a minimal transducer.

The minimization step consists of considering pairs of input label and associated weights as a single label and of applying classical minimization algorithms for automata-In general, there are several distinct minimal subsequential transducers realizing the same function. However, their topology is identical. They only differ by their output labels which can be more or less delayed. The result of the application of pushing to any minimal transducer is however unique. It is the minimal transducer defined in the proof of the existence of a minimal subsequential transducer computing the subsequential function S.

Notice that if a new super final state $\Phi$ to which each final state q is connected by a transition of weight p (q) is introduced, then d (q) in the definition of T' is exactly the length of a shortest path from $\Phi$ to q. Thus, T' can be obtained from T by the classical single-source shortest paths algorithms such as that of Dijkstra if the transition weights are low. This algorithm can be extended to the case where weights are negative. If there is no negative cycle the Bellman-Ford algorithm can be used. In case the transducer is acyclic, a linear time algorithm based on a topological sort of the graph allows one to obtain d.

Once the function d is defined, the transformation of T into T' can be done in linear time, namely O([V]+[E]), if we denote by E the set of transitions of T. The complexity of pushing is therefore linear (O([V]+[E])) if the transducer is acyclic, O([E]+[V] log [V]) the general case if we use Fibonacci heaps in the implementation of the algorithm or ([E]+[V]√[W]) in case the maximum transition weight W is small using the algorithm in an article by Ahuja. Faster algorithm for the shortest path problems.

Also, in case the transducer is acyclic, one can use a specific minimization algorithm with linear time complexity.

Therefore, the overall complexity of the minimization algorithm for a subsequential transducer is $0([V]+[E])$ in case T is acyclic and $0([E] \log [V])$ in the general case. Thus, its complexity is always as good as that of classical automata minimization.

Figure 7:
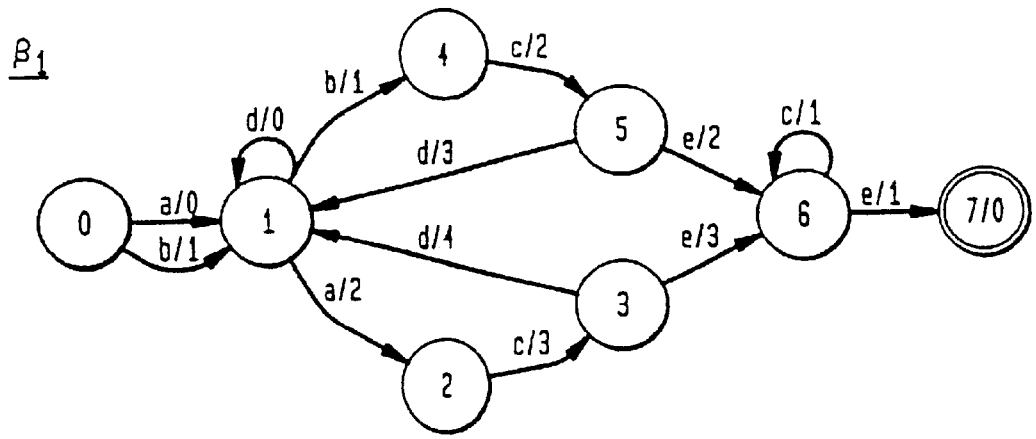
FIGS. 7–9 are graphs of illustrative minimization process where $\beta_1$ represents a subsequential string to weight transducer, $\gamma_1$ represents a transducer obtained from $\beta_1$ by extraction and $\delta_1$ represents a minimal transducer obtained from $\gamma_2$ by automata minimization.
Figure 8:
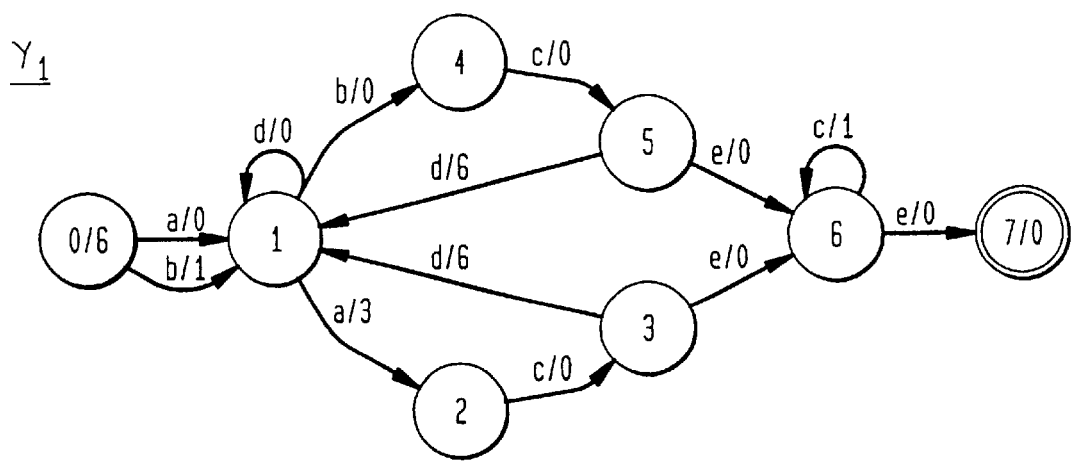
Figure 9:
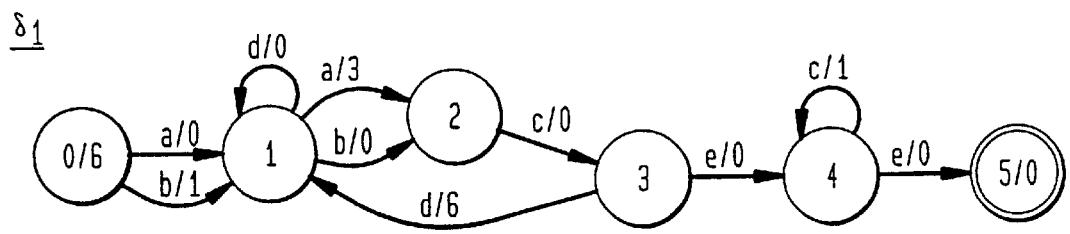

FIGS. 7, 8 and 9 illustrate the minimization process. $\beta_1$ in FIG. 7 represents a subsequential string to weight transducer. Notice that the size of $\beta_1$ cannot be reduced using the automata minimization. $\gamma_1$ in FIG. 8 represents the transducer obtained by pushing, and $\delta_1$ in FIG. 9 is a minimal transducer realizing the same function as $\beta_1$ in the tropical semiring. In particular, the minimal transducer $\delta_1$ shown in FIG. 9 is obtained from the transducer $\gamma_1$ shown in FIG. 8 by collapsing states having identical output transitions, i.e., transitions leaving the states and with the same input label and weight, into a single state. As shown in FIGS. 8 and 9, the states 2 and 4 of the transducer $\gamma_1$ shown in FIG. 8 have single output transitions labeled "c" and having a weight of "0". Thus, the states 2 and 4 of the transducer $\gamma_1$ in FIG. 8 are collapsed into the single state 2 of the transducer $\delta_1$ shown in FIG. 9. Similarly the states 3 and 5 of the transducer $\gamma_1$ shown in FIG. 8 each have a first output transition labeled "d" and having a weight of "6" and a second output transition labeled "e" and having a weight of "0". Thus, the states 3 and 5 of the transducer $\gamma_1$ shown in FIG. 8 are collapsed into the single state 3 of the transducer $\delta_1$ shown in FIG. 9.

The transducer obtained by this algorithm and defined in the proof of the existence of a minimal subsequential transducer computing the subsequential function S has the minimal number of states. One can ask whether there exists a subsequential transducer with the minimal number of transitions and computing the same function as a given subsequential transducer T. The following theorem brings a specific answer to this question.

A minimal subsequential transducer has also the minimal number of transitions among all subsequential transducers realizing the same function. This generalizes the analogous theorem which holds in the case of automata. For example, let T be a subsequential transducer with the minimal number of transitions. Clearly, pushing does not change the number of transitions of T and the automaton minimization which consists in merging equivalent states reduces or does not change this number. Thus, the number of transitions of the minimal transducer of T as previously defined is less or equal to that of T.

Given two subsequential transducers, one might wish to test their equality. The following theorem addresses this question.

Let A be a nondeterministic automaton. Then the automaton $A'=(Q', i', F', \Sigma, \delta')$ obtained reversing A, applying determinization, rereversing the obtained automaton and determinizing it is the minimal deterministic automaton equivalent to A.

Figure 10:
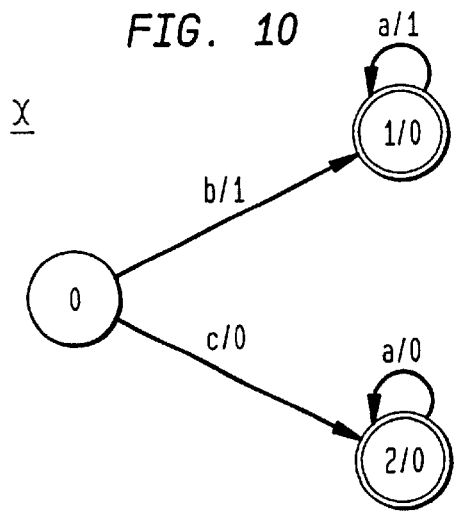
FIG. 10 is a graph of illustrative subsequential transducer X that is not bisubsequential.

A rational power series S can be stated as bisubsequential when S is subsequential and the power series $S_R = \Sigma_{w \in \Sigma^*}(S, w^R)w$ is also subsequential. However, not all subsequential transducers are bisubsequential. FIG. 10 shows a transducer representing a power series S that is not bisubsequential. S is such that:

$$\forall n \in N, (S, ba^n) = n+1$$

$$\forall n \in N, (S, ca^n) = 0$$

The transducer of FIG. 10 is subsequential so S is subsequential. But the reverse $S^R$ is not because it does not have bounded variation. Indeed, since:

$$\forall n \in N, (S^R, a^n b) = n+1$$

$$\forall n \in N, (S^R, a^n c) = 0$$

We have: $\forall n \in N, |(S^R, a^n b) - (S^R, a^n c)| = n+1$

One can give a characterization of bisubsequential power series defined on the tropical semiring in a way similar to that of string-to-string transducers. In particular, the previous sections shows that S is bisubsequential if and only if S and $S^R$ have bounded variation.

Similarly bideterminizable transducers are defined as the transducers T also defined on the tropical semiring admitting two applications of determinization in the following way:
1. The reverse of T, $T^R$ can be determinized. We denote by det $(T^R)$ the resulting transducer.
2. The reverse of det$(T^R)$, $[\det(T^R)]R$ can also be determinized. We denote by det$([\det(T^R)]R)$ the resulting transducer.

In this definition, it is assumed that the reverse operation is performed simply by reversing the direction of the transitions and exchanging initial and final states. Given this definition, we can present the extension of the use of determinization algorithm for power series as minimization tool for bideterminizable transducers.

If T be a bideterminizable transducer defined on the tropical semiring, then the transducer $\det([\det(T^R)]^R)$ obtained by reversing T, applying determinization, rereversing the obtained transducer and determinizing it is a minimal subsequential transducer equivalent to T.

T can be denoted by:

$T_1=(Q_1, i_1, F_1, \Sigma, \delta_1, \sigma_1, \lambda_1, \rho_1)$ $\det(T^R)$, $T'=(Q', i', F', \Sigma, \delta', \sigma', \lambda', \rho')$ $\det([\det(T^R)]^R)$ $T''=(Q'', i'', F'', \Sigma, \delta'', \sigma'', \lambda'', \rho'')$ the transducer obtained from T by pushing.

The double reverse and determinization algorithms clearly do not change the function T realizes. So T' is a subsequential transducer equivalent to T. Then it is necessary to show that T' is minimal. This is equivalent to showing that T" is minimal since T' and T" have the same number of states. $T_1$ is the result of a determinization, hence it is a trim subsequential transducer. It can be shown that $T'=\det(T^R_1)$ is minimal if $T_1$ is a trim subsequential transducer. T is not required to be subsequential.

$S_1$ and $S_2$ be two states of T" equivalent in the sense of automata. It can be shown that $S_1=S_2$, namely that no two distinct states of T" can be merged. This will prove that T" is minimal. Since pushing only affects the output labels, T' and T" have the same set of states: Q'=Q". Hence $S_1$ and $S_2$ are also states of T'. The states of T' can be viewed as weighted subsets whose state elements belong to $T_1$, because T' is obtained by determinization of $T^R_1$.

Let $(q, c) \in Q_1 \times R$ be a pair of the subset $S_1$. Since $T_1$ is trim there exists $\omega \in \Sigma A^*$ such that $\delta_1, (i, \omega) = q$, so $\delta'(S_1, \omega) \in F'$. Since $S_1$ and $S_2$ are equivalent, we also have: $\delta'(S_2, \omega) \in F'$. Since $T_1$ is subsequential, there exists only one state of $T^R_1$ admitting a path labeled with $\omega$ to $i_1$, that state is q. Thus, $q \in S_2$. Therefore any state q member of a pair of $S_1$ is also member of a pair of $S_2$. By symmetry the reverse is also true. Thus exactly the same states are members of the pairs of S1 and S2. There exists k>0 such that:

$$S_1 = \{(q_0, c_{10}), (q_1, c_{11}), \ldots, (q_k, c_{1k})\}$$

$$S_1 = \{(q_0, c_{20}), (q_1, c_{21}), \ldots, (q_k, c_{2k})\}$$

Weights are also the same in $S_1$ and $S_2$. Let $\Pi_j$, $(0 \geq j \geq k)$, be the set of strings labeling the paths from $i_1$ to $q_1$ in $T_1$. $\sigma_1(i_1, \omega)$ is the weight output corresponding to a string $\omega \in \Pi_j$.

Consider the accumulated weights $c_{ij}$, $1 \leq i \leq 2, 0 \leq j \leq k$, in determinization of $T^R_1$. Each $c_{1j}$ for instance corresponds to the weight not yet output in the paths reach $S_1$. It needs to be added to the weights of any path from $q_j \epsilon S_1$ to a final state in $\text{rev}(T_1)$. In other terms, the determinization algorithm will assign the weight $c_{1j} + \sigma_1(i_1, \omega) + \lambda_1$ to a path labeled with $\omega^R$ reaching a final state of T' from $S_1$. T" is obtained by pushing from T'. Therefore, the weight of such a path in T" is:

$$c_{1j} + \sigma_1(i_1, \omega) + \lambda_1 - \min_{0 \leq j \leq k, \omega \in \Pi_j} \{c_{1j} + \sigma_1(i_1, \omega) + \lambda_1\}$$

Similarly, the weight of a path labeled with the same string considered from $S_2$ is:

$$c_{2j} + \sigma_1(i_1, \omega) + \lambda_1 - \min_{0 \leq j \leq k, \omega \in \Pi_j} \{c_{2j} + \sigma_1(i_1, \omega) + \lambda_1\}$$

Since $S_1$ and $S_2$ are equivalent in T" the weights of the paths from $S_1$ or $S_2$ to F' are equal. Thus, $\forall \omega \epsilon \Pi_j$, $\forall j \epsilon [0,k]$, $$c_{1j} + \sigma_1(i_1, \omega) - \min_{l \in [0,k], \omega \in \Pi_j} \{c_{1j} + \sigma_1(i_1, \omega)\} =$$

$$c_{2j} + \sigma_1(i_1, \omega) - \min_{l \in [0,k], \omega \in \Pi_j} \{c_{2j} + \sigma_1(i_1, \omega)\}$$

Hence $\forall j \in [0, k]$, $c_{1j} - \min_{l \in [0,k]} = \{c_{11}\} = c_{2j} - \min_{l \in [0,k]} \{c_{21}\}$ In the determinization section, the minimum weight of the pairs of any subset is 0. Therefore, $\forall j \epsilon [0,k]$, $c_{1j} = C_{2j}$ and $S_2 = S_1$.

FIGS. 11–13 illustrate the minimization of string to weight transducers using the determinization algorithm. The transducer $\beta_2$ of FIG. 11 is obtained from that of FIG. 7, $\beta_1$, by reversing it. The application of determinization to $\beta_2$ results in $\beta_3$ as shown in FIG. 12. Notice that since $\beta_1$ is subsequential, according to the theorem the transducer $\beta_3$ is minimal too. $\beta_3$ is then reversed and determinized. The resulting transducer $\beta_4$ in FIG. 13 is minimal and equivalent to $\beta_1$. One can compare the transducer $\beta_4$ to the transducer of FIG. 9, $\delta_1$. Both are minimal and realize the same function. $\delta_1$ provides output weights as soon as possible. It can be obtained from $\beta_4$ by pushing.

6. Application to Speech Recognition

In the previous sections we gave a theoretical description of the determinization and minimization algorithms for string to weight transducers. Here we indicate their use in practice by describing applications of the algorithms for speech recognition.

String to weight transducers are found at several steps of speech recognition. Phone lattices, language models, and word lattices are typically represented by such transducers. Weights in these graphs correspond to negative logarithms of probabilities. Therefore, they are added along a path. For a given string there might be many different paths in a transducer. The minimum of the total weights of these paths is only considered as relevant information. Thus, the main operations involved in the interpretation of these transducers are addition and min, which are those of the tropical semirings. Thus the algorithms we defined in the previous sections apply to speech recognition.

In the preferred embodiment of the present invention, word lattices are obtained by combining distributions over acoustic observations with acoustic models including context dependency restrictions, combined with pronunciation dictionaries and language models. For a given utterance, the word lattice obtained in such a way contains many paths labeled with the possible sentences and their probabilities. These lattices can be searched to find the most probable sentences which correspond to the best paths, the paths with the smallest weights.

Figure 14:
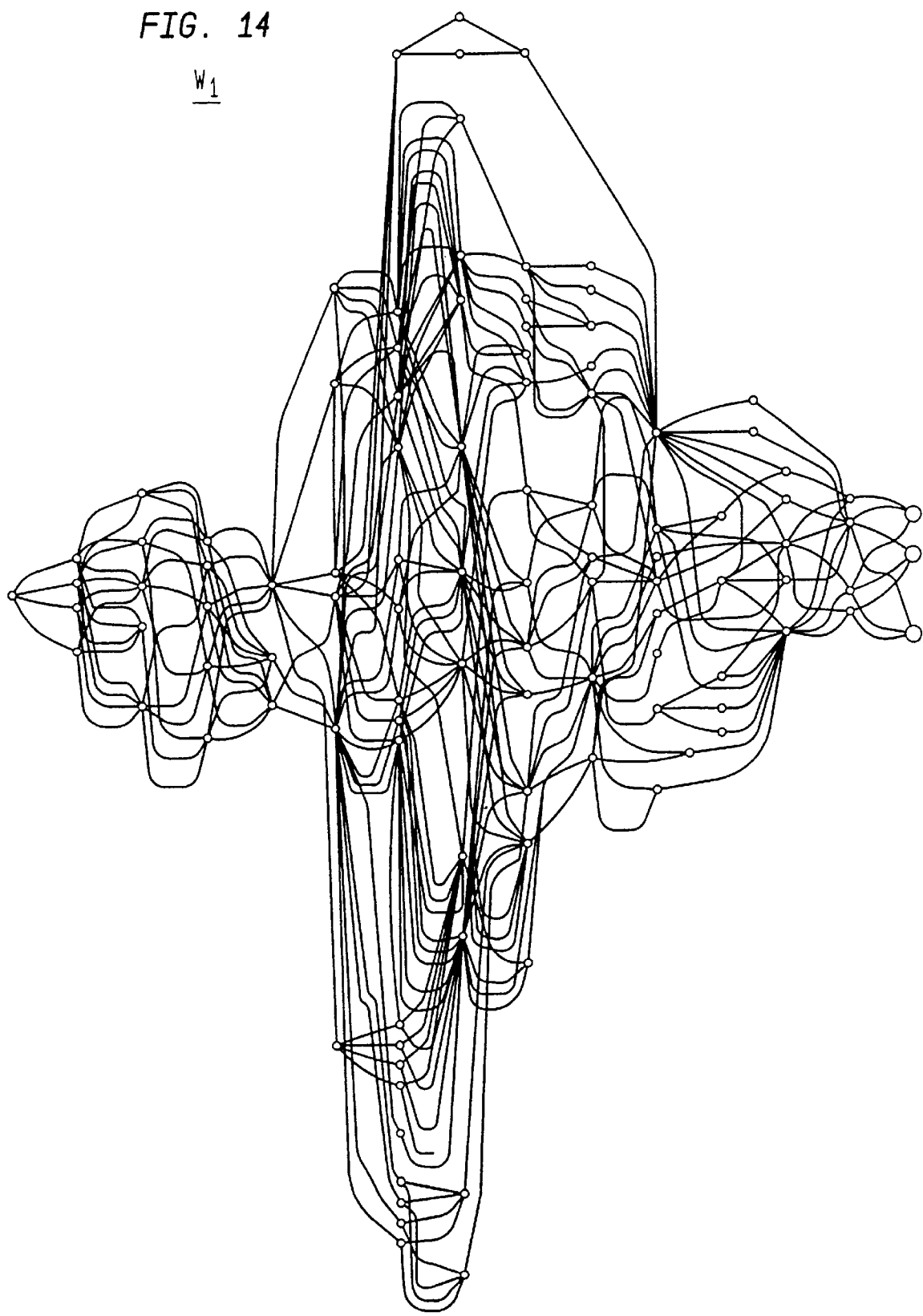
FIG. 14 is a graph of illustrative word lattice $W_1$ for the utterance "which flights leave Detroit and arrive at Saint-Petersburg around nine a.m.?"

FIG. 14 corresponds to a typical word lattice $W_1$ obtained in speech recognition. It corresponds to the following utterance: "Which flights leave Detroit and arrive at Saint-Petersburg around nine a.m.?" Clearly the lattice is complex and contains much redundancy. Many sentences are repeated in the lattice with different weights. It contains about 83 million paths. Usually it is not enough to consider the best path. One needs to correct the best path approximation by considering the n best paths, where the value of n depends on the task considered. Notice that in case n is very large one would need to consider all these 83 million paths. The transducer contains 106 states and 359 transitions.

Determinization applies to this lattice. The resulting transducer $W_2$ as shown in FIG. 15 is sparser. Recall that it is equivalent to $W_1$. It realizes exactly the same function mapping strings to weights. For a given sentence s recognized by $W_1$ there are many different paths with different total weights. $W_2$ contains a path labeled with s and with a total weight equal to the minimum of the weights of the paths of $W_1$. No pruning, heuristics or approximation has been used here. The lattice $W_2$ only contains 18 paths. It is not hard to realize that the search stage in speech recognition is greatly simplified when applied to $W_2$ rather than $W_1$. $W_2$ admits 38 states and 51 transitions.

The transducer $W_2$ can still be minimized. The minimization algorithm described in the previous section leads to the transducer $W_3$ as shown in FIG. 16. It contains 25 states and 33 transitions and of course the same number of paths as $W_2$, 18. The effect of minimization appears as less important. This is because determinization includes here a large part of the minimization by reducing the size of the first lattice. This can be explained by the degree of non-determinism of word lattices such as $W_1$. Many states can be reached by the same set of strings. These states are grouped into a single subset during determinization.

Also the complexity of determinization is exponential in general, but in the case of the lattices considered in speech recognition, this is not the case. A more specific determinization can be used in the cases very often encountered in natural language processing where the graph admits a loop at the initial state over the elements of the alphabet. Since they contain much redundancy the resulting lattice is smaller than the initial. In fact, the time complexity of determinization can be expressed in terms of the initial and resulting lattices $W_1$ and $W_2$ by $0(|A| \log |A|(|W_1||W_2|)^2)$, where $|W_1|$ and $|W_2|$ denote the sizes of $W_{1\ and\ W_2}$. Clearly if we restrict determinization to the cases where $|W_2| \leq |W_1|$ its complexity is polynomial in terms of the size of the initial transducer $|W_1|$. The same remark applies to the space complexity of the algorithm. In practice the algorithm appears to be very efficient. As an example, it takes about 0.1s on a Silicon Graphics (indy 100 MHZ Processor, 64 Mb RAM; The main part of this time corresponds to I/O's and is therefore independent of the algorithm.) to determinize the transducer $W_1$ of FIG. 14.

Determinization makes the use of lattices much faster. Since at any state there exists at most one transition labeled with the word considered, finding the weight associated with a sentence does not depend on the size of the lattice. The time and space complexity of such an operation is simply linear in the size of the sentence. When dealing with large tasks, most speech recognition systems use a rescoring method. This consists in first using a poor acoustic or grammar model to produce a word lattice, and then to reuse this word lattice with a more sophisticated model. The size of the word lattice is then a critical parameter in time and space efficient of the system. The determinization and minimization algorithms we presented allow one to considerably reduce the size of such word lattices as seen in the examples that experimented both determinization and minimization algorithms in the ATIS task. The table in FIG. 17 illustrates these results. It shows these algorithms to be very efficient in reducing the redundancy of speech networks in this task. The reduction is also illustrated in the exemplary ATIS task as follows:

Example of word lattice in the ATIS task.
States: 187→37
Transitions: 993→59
Paths: $>2^{32}$→6993

The number of paths of the word lattice before determinization was larger than that of the largest integer representable with 32 bits machines. We also experimented the minimization algorithm by applying it to several word lattices obtained in the NAB task. These lattices were already determinized. The table in FIG. 18 shows the average reduction factors we obtained when using the minimization algorithms with several deterministic lattices obtained for utterances of the NAB task. The reduction factors help to measure the gain of minimization alone since the lattices are already deterministic. The figures of the following example correspond to a typical case. Here is an example of reduction we obtained.

Example of word lattice in NAB task.
Transitions: 108211→37563
States: 10407→2553

An important characteristic of the determinization algorithm is that it can be used on the-fly. Indeed, the determinization algorithm is such that given a subset representing state of the resulting transducer, the definition of the transitions leaving that state only depends on that state or equivalently on the underlying subset, and on the transducer to determinize. We have given an implementation of the determinization which allows one both to completely expand the result or to expand it on demand. Arcs leaving state of the determinized transducer are expanded only if needed. This characteristic of the implementation is important. It can then be used for instance at any step in on-the-fly cascade of composition of transducers in speech recognition to expand only the necessary part of a lattice or transducer. One of the essential implications of the implementation is that it contributes to saving space during the search stage. It is also very useful in speeding up the n-best decoder in speech recognition.

It will be understood that the foregoing is only illustrative of the principles of the invention and that various modifications can be made by those skilled in the art without departing from the scope and spirit of the invention. For example, the determinization and minimization algorithms for string to weight transducers have other applications in speech processing. Many new experiments can be done using these algorithms at different stages of the recognition. They might lead to reshape some of the methods used in this field in particular by providing a new success of the theory of automata and transducers.

We briefly presented the theoretical bases, algorithmic tools and the practical use of set of devices which seem to fit the complexity of language and provide efficiency space and time. It helps to describe the possibilities they offer and to guide algorithmic choices. The notion of determinization can be generalized to that of $\epsilon$-determinization, for instance, requiring more general algorithms. Other extensions of sequential transducers such as polysubsequential transducers can be considered. New characterizations of rational function in terms of groups could shed new light on some aspects of the theory of finite transducers. The generalization of the operations in the preferred embodiment of the invention is based on that of the notions of semirings and power series.

Sequential transducers admit very efficient algorithms. Sequential machines lead to useful algorithms in many other areas of computational linguistics. In particular, subsequential power series allow one to achieve efficient results in indexation of natural language texts. Furthermore more precision in acoustic modeling, finer language models, fine and large lexicon grammars, a larger vocabulary will lead in the near future to networks of much larger sizes in speech recognition. The determinization and minimization algorithms may limit the size of these networks while keeping their time efficiency. These algorithms also apply to text-to-speech synthesis. In fact, the same operations of composition of transducers and perhaps more important size issues can be found in this field. Other specific example of possible uses of the invention include its application in optical character recognition ("OCR"), sampling of genes or biological samples, machine translation (e.g., speech-to-speech of text-to-text), text-to-speech synthesis, handwriting recognition search engine in worldwide web and even stability control of an aircraft.

What is claimed is:

1. In a method for pattern recognition, wherein a weighted and labeled graph is used to recognize at least one pattern in a input signal, a method for reducing at least one of redundancy and size of a non-deterministic weighted and labeled graph by generating a weighted and labeled deterministic graph from the weighted and labeled non-deterministic graph using a data processing system, the non-deterministic graph having nodes and arcs connecting the nodes and stored in a memory of the data processing device, the method comprising:

labeling the graph by assigning content to the arcs;

evaluating weights of each path between two nodes, each path comprising at least one arc, by examining at least one relationship between the corresponding contents;

assigning one of the weights to each arc of each path; and determinizing the graph to create the determinized graph having nodes and arcs connecting the nodes, the nodes having substates, each substate corresponding to a node of the non-deterministic graph and containing a remainder, each arc labeled with a minimum weight;

assigning one of the weights to each arc of each path; and determinizing the graph to create the determinized graph having nodes and arcs connecting the nodes, the nodes having substates, each substate corresponding to a node of the non-deterministic graph and containing a remainder, each arc labeled with a minimum weight.

2. The method of claim 1, further comprising minimizing the deterministic graph by collapsing a portion of the nodes of the deterministic graph.

3. The method of claim 2, wherein minimizing the graph comprises reversing the deterministic graph to form a reversed graph; and determinizing the reversed graph.

4. The method of claim 1, further comprising determining a determinizability of the non-deterministic graph to determine if the non-deterministic graph is suitable for determinization.

5. In a method of pattern recognition, executing on a data processing system having a controller and a memory, wherein a weighted finite-state transducer is used to recognize at least one pattern in an input signal, a method for reducing at least one of redundancy and size of a non-deterministic weighted finite-state transducer by generating a deterministic weighted finite-state transducer from the non-deterministic weighted finite-state transducer stored in the memory, the non-deterministic weighted finite-state transducer having a plurality of states and a plurality of transitions connecting the states, each transition having a label and a weight, comprising:

a) generating and storing in the memory an initial state of the deterministic weighted finite-state transducer from initial states of the non-deterministic weighted finite-state transducer, the initial state of the deterministic weighted finite-state transducer having at least one substate; each substate corresponding to an initial state of the non-deterministic weighted finite-state transducer and having a remainder;

b) selecting the initial state of the deterministic weighted finite-state transducer as a current state;

c) determining, for the states of the non-deterministic weighted finite-state transducer that correspond to the substates of the current state, a set of labels of transitions extending from those states of the non-deterministic weighted finite-state transducer;

d) determining, for each label, at least one state of the non-deterministic weighted finite-state transducer that is reachable from at least one of the states of the non-deterministic weighted finite-state transducer that correspond to the substates of the current state of the deterministic weighted finite-state transducer over a transition having that label;

e) forming and storing in the memory, for each label, a new state of the deterministic weighted finite-state transducer based on the determined at least one reachable state of the non-deterministic weighted finite-state transducer for that label, the new state having one substate corresponding to each at least one reachable state of the non-deterministic weighted finite-state transducer for that label;

f) creating and storing in the memory, for each label and corresponding new state, a new transition from the current state of the deterministic weighted finite-state transducer to that new state, that label associated with the new transition;

g) determining and storing in the memory, for each label and corresponding new state and corresponding new transition, a minimum weight for that new transition based on the substates of that new state, weights of the transitions having that label extending between the states of the non-deterministic weighted finite-state transducer corresponding to the substates of the current state and that new state, and the remainders of the substates of the current state;

h) determining and storing in the memory, for each label and corresponding new state, and for each substate of that new state, a remainder based on the determined weight for the new transition to that new state from the current state, the remainders of the at least one substate of the current state and the weights of the transitions having that label extending between the states of the non-deterministic weighted finite-state transducer corresponding to the substates of the current state and that new state; and i) repeating steps c–g until each new state has been selected as the current state.

6. The method of claim 5, further comprising:

determining, for each new state, whether there is a previously determined state of the deterministic finite-state transducer that is identical to that new state; and if there is an identical previously determined state of the deterministic finite-state transducer:

modifying the new transition extending from the current state to that new state to extend from the current state to the identical previously determined state of the deterministic finite-state transducer, and deleting that new state from the memory.

7. The method of claim 6, wherein determining if that new state is identical to a previously determined state of the deterministic weighted finite-state transducer comprises:

determining if a previously determined state of the deterministic weighted finite-state transducer has a same set of substates as that new state; and determining, for each substate of the previously determined state, whether a remainder of that substate is the same as the remainder of the corresponding substate of that new state.

8. The method of claim 6, wherein determining if that new state is identical to a previously determined state of the deterministic weighted finite-state transducer comprises:

determining if that new state has a set of substates that includes all of the substates of a previously determined state of the deterministic weighted finite-state transducer; and determining, for each substate of the previously determined state, whether a remainder of that substate is the same as the remainder of the corresponding substate of that new state.

9. In a method of pattern recognition, executing on a data processing system having a controller and a memory, wherein a weighted finite-state transducer is used to recognize at least one pattern in an input signal, a method for reducing at least one of redundancy and size of a non-deterministic weighted finite-state transducer by generating a deterministic weighted finite-state transducer from the non-deterministic weighted finite-state transducer stored in the memory, the non-deterministic weighted finite-state transducer having a plurality of states and a plurality of transitions connecting the states, each transition having a label and a weight, comprising:

a) generating and storing in the memory an initial state of the deterministic weighted finite-state transducer from initial states of the non-deterministic weighted finite-state transducer, the initial state of the deterministic weighted finite-state transducer having at least one substate; each substate corresponding to an initial state of the non-deterministic weighted finite-state transducer and having a remainder;

b) selecting a state of the deterministic weighted finite-state transducer as a current state;

c) determining, for the states of the non-deterministic weighted finite-state transducer that correspond to the substates of the current state, a set of labels of transitions extending from those states of the non-deterministic weighted finite-state transducer;

d) determining, for each label, at least one state of the non-deterministic weighted finite-state transducer that is reachable from at least one of the states of the non-deterministic weighted finite-state transducer that correspond to the substates of the current state of the deterministic weighted finite-state transducer over a transition having that label;

e) forming and storing in the memory, for each label, a new state of the deterministic weighted finite-state transducer based on the determined at least one reachable state of the non-deterministic weighted finite-state transducer for that label, the new state having one substate corresponding to each at least one reachable state of the non-deterministic weighted finite-state transducer for that label;

f) creating and storing in the memory, for each label and corresponding new state, a new transition from the current state of the deterministic weighted finite-state transducer to that new state, that label associated with the new transition;

g) determining and storing in the memory, for each label and corresponding new state and corresponding new transition, a minimum weight for that new transition;

h) determining and storing in the memory, for each label and corresponding new state, and for each substate of that new state, a remainder; and i) repeating steps b–g until each state of the deterministic finite-state transducer has been selected as the current state.

10. The method of claim 9, wherein the minimum weight for that new transition is determined based on the substates of that new state, weights of the transitions having that label extending between the states of the non-deterministic weighted finite-state transducer corresponding to the substates of the current state and that new state, and the remainders of the substates of the current state.

11. The method of claim 9, wherein the remainder for that label and corresponding new state and for that substate of that new state is determined based on the determined weight for the new transition to that new state from the current state, the remainders of the at least one substate of the current state and the weights of the transitions having that label extending between the states of the non-deterministic weighted finite-state transducer corresponding to the substates of the current state and that new state.

12. The method of claim 9, further comprising:
   determining, for each new state, whether there is a previously determined state of the deterministic finite-state transducer that is identical to that new state; and
   if there is an identical previously determined state of the deterministic finite-state transducer:
      modifying the new transition extending from the current state to that new state to extend from the current state to the identical previously determined state of the deterministic finite-state transducer, and
      deleting that new state from the memory.

13. The method of claim 12, wherein determining if that new state is identical to a previously determined state of the deterministic weighted finite-state transducer comprises:
   determining if a previously determined state of the deterministic weighted finite-state transducer has a same set of substates as that new state; and
   determining, for each substate of the previously determined state, whether a remainder of that substate is the same as the remainder of the corresponding substate of that new state.

14. The method of claim 12, wherein determining if that new state is identical to a previously determined state of the deterministic weighted finite-state transducer comprises:
   determining if that new state has a set of substates that includes all of the substates of a previously determined state of the deterministic weighted finite-state transducer; and
   determining, for each substate of the previously determined state, whether a remainder of that substate is the same as the remainder of the corresponding substate of that new state.

15. A pattern recognition system, executing on a data processing system having a controller and a memory, that uses a weighted finite-state transducer to recognize at least one pattern in an input signal, the pattern recognition system comprising a deterministic weighted finite-state transducer generating system that reduces at least one of redundancy and size of a non-deterministic weighted finite state transducer by generating a deterministic weighted finite-state transducer from the non-deterministic weighted finite-state transducer stored in the memory, the non-deterministic weighted finite-state transducer having a plurality of states and a plurality of transitions connecting the states, each transition having a label and a weight, the deterministic weighted finite-state transducer generating system comprising:

initial state generating means for generating and storing in the memory an initial state of the deterministic weighted finite-state transducer from initial states of the non-deterministic weighted finite-state transducer, the initial state of the deterministic weighted finite-state transducer having at least one substate; each substate corresponding to an initial state of the non-deterministic weighted finite-state transducer and having a remainder;

state selecting means for selecting a state of the deterministic weighted finite-state transducer as a current state;

label determining means for determining, for the states of the non-deterministic weighted finite-state transducer that correspond to the substates of the current state, a set of labels of transitions extending from those states of the non-deterministic weighted finite-state transducer;

state determining means for determining, for each label, at least one state of the non-deterministic weighted finite-state transducer that is reachable from at least one of the states of the non-deterministic weighted finite-state transducer that correspond to the substates of the current state of the deterministic weighted finite-state transducer over a transition having that label;

state forming means for forming and storing in the memory, for each label, a new state of the deterministic weighted finite-state transducer based on the determined at least one reachable state of the non-deterministic weighted finite-state transducer for that label, the new state having one substate corresponding to each at least one reachable state of the non-deterministic weighted finite-state transducer for that label;

transition creating means for creating and storing in the memory, for each label and corresponding new state, a new transition from the current state of the deterministic weighted finite-state transducer to that new state, that label associated with the new transition;

weight determining means for determining and storing in the memory, for each label and corresponding new state and corresponding new transition, a minimum weight for that new transition based on the substates of that new state, weights of the transitions having that label extending between the states of the non-deterministic weighted finite-state transducer corresponding to the substates of the current state and that new state, and the remainders of the substates of the current state; and remainder determining means for determining and storing in the memory, for each label and corresponding new state, and for each substate of that new state, a remainder based on the determined weight for the new transition to that new state from the current state, the remainders of the at least one substate of the current state and the weights of the transitions having that label extending between the states of the non-deterministic weighted finite-state transducer corresponding to the substates of the current state and that new state.

16. The deterministic weighted finite-state transducer generating system of claim 15, further comprising:

identical state determining means for determining, for each new state, whether there is a previously determined state of the deterministic finite-state transducer that is identical to that new state;

modifying means for modifying, if there is an identical previously determined state of the deterministic finite-state transducer, the new transition extending from the current state to that new state to extend from the current state to the identical previously determined state of the deterministic finite-state transducer, and deleting means for deleting that new state from the memory.

17. The deterministic weighted finite-state transducer generating system of claim 15, wherein the identical state determining means comprises:

means for determining if a previously determined state of the deterministic weighted finite-state transducer has a same set of substates as that new state; and means for determining, for each substate of the previously determined state, whether a remainder of that substate is the same as the remainder of the corresponding substate of that new state.

18. The deterministic weighted finite-state transducer generating system of claim 15, wherein the identical state determining means comprises:

means for determining if that new state has a set of substates that includes all of the substates of a previously determined state of the deterministic weighted finite-state transducer; and means for determining, for each substate of the previously determined state, whether a remainder of that substate is the same as the remainder of the corresponding substate of that new state.

19. A pattern recognition system, executing on a data processing system having a controller and a memory, that uses a weighted finite-state transducer to recognize at least one pattern in an input signal, the pattern recognition system comprising a deterministic weighted finite-state transducer generating system that reduces at least one of redundancy and size of a non-deterministic weighted finite state transducer by generating a deterministic weighted finite-state transducer from the non-deterministic weighted finite-state transducer stored in the memory, the non-deterministic weighted finite-state transducer having a plurality of states and a plurality of transitions connecting the states, each transition having a label and a weight, the deterministic weighted finite-state transducer generating system comprising:

initial state generating means for generating and storing in the memory an initial state of the deterministic weighted finite-state transducer from initial states of the non-deterministic weighted finite-state transducer, the initial state of the deterministic weighted finite-state transducer having at least one substate; each substate corresponding to an initial state of the non-deterministic weighted finite-state transducer and having a remainder;

state selecting means for selecting a state of the deterministic weighted finite-state transducer as a current state;

label determining means for determining, for the states of the non-deterministic weighted finite-state transducer that correspond to the substates of the current state, a set of labels of transitions extending from those states of the non-deterministic weighted finite-state transducer;

state determining means for determining, for each label, at least one state of the non-deterministic weighted finite-state transducer that is reachable from at least one of the states of the non-deterministic weighted finite-state transducer that correspond to the substates of the current state of the deterministic weighted finite-state transducer over a transition having that label;

state forming means for forming and storing in the memory, for each label, a new state of the deterministic weighted finite-state transducer based on the determined at least one reachable state of the non-deterministic weighted finite-state transducer for that label, the new state having one substate corresponding to each at least one reachable state of the non-deterministic weighted finite-state transducer for that label;

transition creating means for creating and storing in the memory, for each label and corresponding new state, a new transition from the current state of the deterministic weighted finite-state transducer to that new state, that label associated with the new transition;

weight determining means for determining and storing in the memory, for each label and corresponding new state and corresponding new transition, a minimum weight for that new transition; and remainder determining means for determining and storing in the memory, for each label and corresponding new state, and for each substate of that new state, a remainder.

20. The deterministic weighted finite-state transducer generating system of claim 19, wherein the weight determining means determines the minimum weight based on the substates of that new state, weights of the transitions having that label extending between the states of the non-deterministic weighted finite-state transducer corresponding to the substates of the current state and that new state, and the remainders of the substates of the current state deleting means for deleting that new state from the memory.

21. The deterministic weighted finite-state transducer generating system of claim 19, wherein the remainder determining means determines the remainder for each label and corresponding new state and for each substate of that new state, based on the determined weight for the new transition to that new state from the current state, the remainders of the at least one substate of the current state and the weights of the transitions having that label extending between the states of the non-deterministic weighted finite-state transducer corresponding to the substates of the current state and that new state.

22. The deterministic weighted finite-state transducer generating system of claim 19, further comprising:

identical state determining means for determining, for each new state, whether there is a previously determined state of the deterministic finite-state transducer that is identical to that new state;

modifying means for modifying, if there is an identical previously determined state of the deterministic finite-state transducer, the new transition extending from the current state to that new state to extend from the current state to the identical previously determined state of the deterministic finite-state transducer, and deleting means for deleting that new state from the memory.

23. The deterministic weighted finite-state transducer generating system of claim 19, wherein the identical state determining means comprises:

means for determining if a previously determined state of the deterministic weighted finite-state transducer has a same set of substates as that new state; and means for determining, for each substate of the previously determined state, whether a remainder of that substate is the same as the remainder of the corresponding substate of that new state.

24. The deterministic weighted finite-state transducer generating system of claim 19, wherein the identical state determining means comprises:

means for determining if that new state has a set of substates that includes all of the substates of a previously determined state of the deterministic weighted finite-state transducer; and means for determining, for each substate of the previously determined state, whether a remainder of that substate is the same as the remainder of the corresponding substate of that new state.

\* \* \* \* \*